United States Patent
Ban et al.

(10) Patent No.: US 6,480,936 B1
(45) Date of Patent: Nov. 12, 2002

(54) STORING APPARATUS HAVING A DYNAMIC BUFFER FOR RANDOM OR SEQUENTIAL ACCESS

(75) Inventors: Akira Ban, Yokohama (JP); Hiroshi Ichii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/197,076

(22) Filed: Nov. 20, 1998

(30) Foreign Application Priority Data

Jun. 15, 1998 (JP) .......................................... 10-167442

(51) Int. Cl.$^7$ ............................................... G06F 12/00
(52) U.S. Cl. ...................... 711/118; 711/129; 711/153; 711/156; 711/170; 711/113
(58) Field of Search ................................ 711/113, 118, 711/129, 153, 156, 170, 171, 172, 173

(56) References Cited

U.S. PATENT DOCUMENTS

| 5,682,500 | A |   | 10/1997 | Vishlitzky et al. |           |
|-----------|---|---|---------|-------------------|-----------|
| 5,915,260 | A | * | 6/1999  | Sokolov ......................  | 711/113 |
| 5,966,726 | A | * | 10/1999 | Sokolov ......................  | 711/113 |
| 6,061,763 | A | * | 5/2000  | Rubin et al. .................  | 711/118 |
| 6,092,149 | A | * | 7/2000  | Hicken et al. ...............  | 711/112 |
| 6,209,057 | B1| * | 3/2001  | Ban et al. ....................  | 711/111 |
| 6,256,705 | B1| * | 7/2001  | Li et al. ......................  | 711/112 |

FOREIGN PATENT DOCUMENTS

| EP | 301211   | 2/1989  |
| JP | 62194562 | 8/1987  |
| JP | 2219159  | 8/1990  |
| JP | 8123730  | 5/1996  |
| JP | 8137754  | 5/1996  |
| JP | 9284693  | 10/1997 |

* cited by examiner

Primary Examiner—Matthew Kim
Assistant Examiner—Christian P. Chace
(74) Attorney, Agent, or Firm—Greer, Burns & Crain, Ltd.

(57) ABSTRACT

When a write access is received from an upper apparatus, a cache control unit develops write data into a data buffer area in a memory, notifies the upper apparatus of a normal end, and thereafter, writes the write data developed into the data buffer area onto a storing medium. An access kind discriminating unit analyzes whether the write access from the host is a sequential access or a random access. A buffer construction control unit selects a data buffer construction of the optimum number of sections in accordance with an access kind and executes the caching operation.

17 Claims, 39 Drawing Sheets

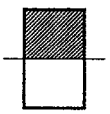
FIG. 8A
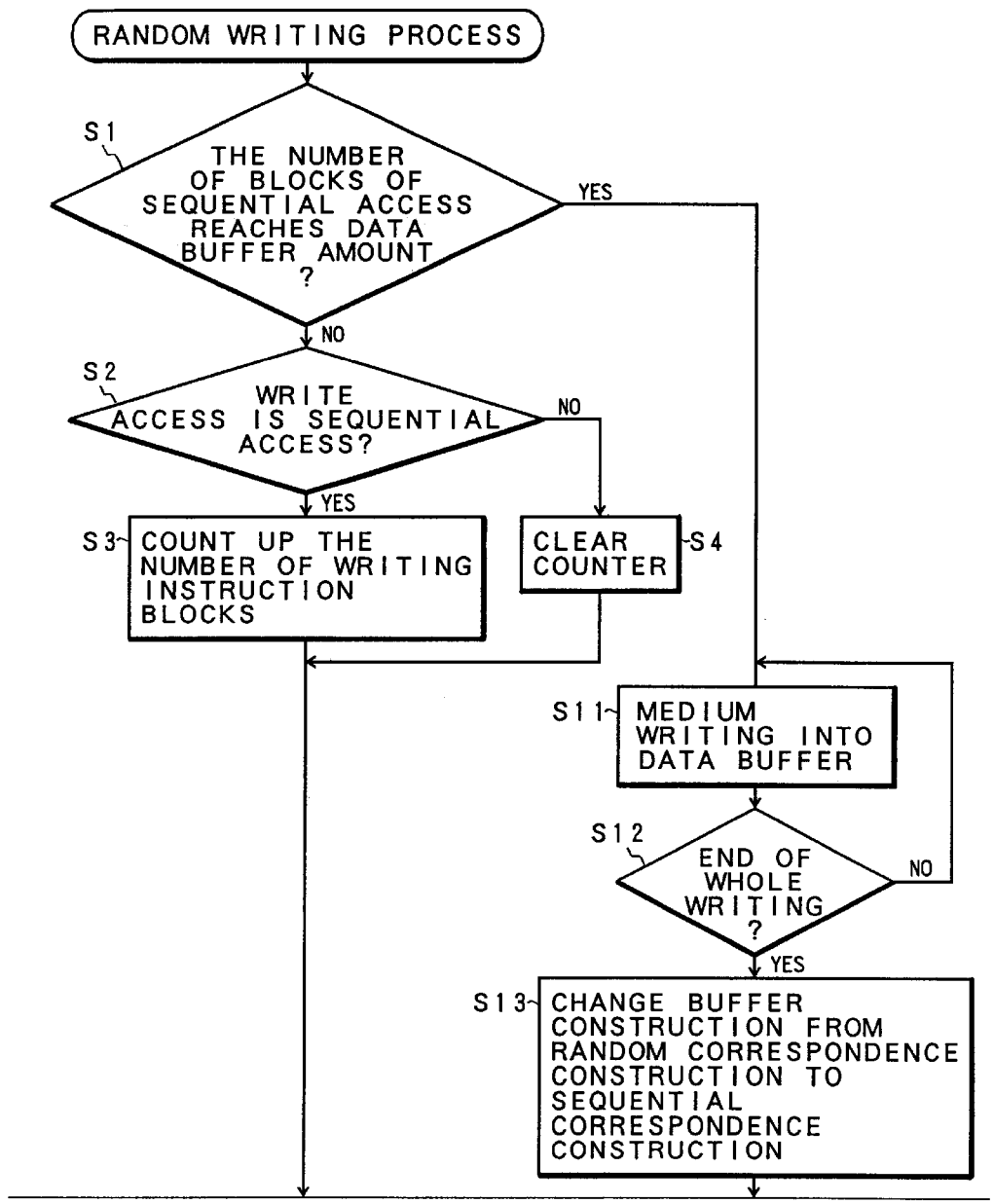

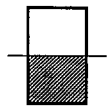
FIG. 8B
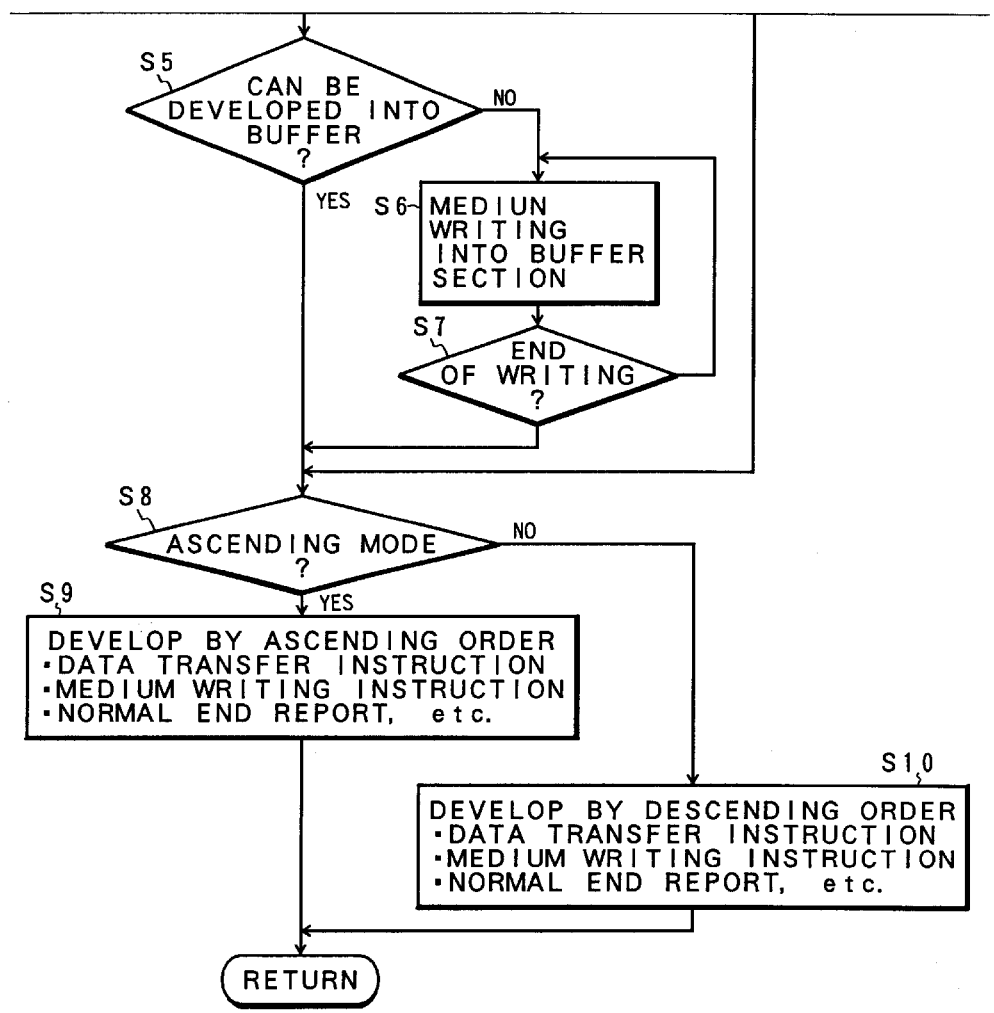

FIG. 9A

ASCENDING ORDER DEVELOPMENT

| B1 | B2 | B3 | B4 | B5 | B6 |
|---|---|---|---|---|---|
| #1 | #2 | #3 | #4 | #5 | #6 |

FIG. 9B

DESCENDING ORDER DEVELOPMENT

| B1 | B2 | B3 | B4 | B5 | B6 |
|---|---|---|---|---|---|
| #6 | #5 | #4 | #3 | #2 | #1 |

FIG. 9C

MIXED ORDER DEVELOPMENT

| B1 | B2 | B3 | B4 | B5 | B6 |
|---|---|---|---|---|---|
| #1 |  |  | #4 |  | #6 |
|  | #2 | #3 |  | #5 |  |

FIG. 11A

ASCENDING ORDER DEVELOPMENT

| C 1 | | C 2 |
|---|---|---|
| # 1 | # 7 | |
| # 2 | # 8 | |
| # 3 | # 9 | |
| # 4 | # 1 0 | |
| # 5 | # 1 1 | |
| # 6 | # 1 2 | |

FIG. 11B

DESCENDING ORDER DEVELOPMENT

| C 1 | C 2 | |
|---|---|---|
| | # 1 2 | # 6 |
| | # 1 1 | # 5 |
| | # 1 0 | # 4 |
| | # 9 | # 3 |
| | # 8 | # 2 |
| | # 7 | # 1 |

FIG. 13

| | [WRITE COMMAND] | [LOGIC BLOCK ADDRESS LBA/ THE NUMBER OF BLOCKS BC] |
|---|---|---|
| ASCENDING ORDER RANDOM ACCESS 60 | #1. | WRITE:LBA=1000h/BC=10h |
| | #2. | WRITE:LBA=2000h/BC=10h |
| | #3. | WRITE:LBA=3000h/BC=10h |
| | #4. | WRITE:LBA=4000h/BC=10h |
| | #5. | WRITE:LBA=5000h/BC=10h |
| | #6. | WRITE:LBA=6000h/BC=10h |
| | #7. | WRITE:LBA=2010h/BC=10h |
| | #8. | WRITE:LBA=3010h/BC=10h |
| | #9. | WRITE:LBA=4010h/BC=10h |
| | #10. | WRITE:LBA=5010h/BC=10h |
| | #11. | WRITE:LBA=6010h/BC=10h |
| ASCENDING ORDER SEQUENTIAL ACCESS 62 | #12. | WRITE:LBA=7000h/BC=10h |
| | #13. | WRITE:LBA=7010h/BC=10h |
| | #14. | WRITE:LBA=7020h/BC=10h |
| | ⁝ | ⁝ |
| | #47. | WRITE:LBA=7240h/BC=10h |
| | ⁝ | ⁝ |
| | #n. | WRITE:LBA=****h/BC=10h |

FIG. 14A

| B 1 | B 2 | B 3 | B 4 | B 5 | B 6 |
|---|---|---|---|---|---|
| #1 | # 2 | # 3 | # 4 | # 5 | # 6 |
|  | # 7 | # 8 | # 9 | # 10 | # 11 |

[DURING THE MEDIUM WRITING] [STANDBY] [STANDBY] [STANDBY] [STANDBY] [STANDBY]

FIG. 14B

| B 1 | B 2 | B 3 | B 4 | B 5 | B 6 |
|---|---|---|---|---|---|
| # 12 | # 2 | # 3 | # 4 | # 5 | # 6 |
| # 13 | # 7 | # 8 | # 9 | # 10 | # 11 |
| # 14 |  |  |  |  |  |
| # 15 |  |  |  |  |  |
| # 16 |  |  |  |  |  |
| # 17 |  |  |  |  |  |

[DEVELOPMENT] [DURING THE MEDIUM WRITING] [STANDBY] [STANDBY] [STANDBY] [STANDBY]

FIG. 14C

| B 1 | B 2 | B 3 | B 4 | B 5 | B 6 |
|---|---|---|---|---|---|
| # 12 | # 18 | # 3 | # 4 | # 5 | # 6 |
| # 13 | # 19 | # 8 | # 9 | # 10 | # 11 |
| # 14 | # 20 |  |  |  |  |
| # 15 | # 21 |  |  |  |  |
| # 16 | # 22 |  |  |  |  |
| # 17 | # 23 |  |  |  |  |

[STANDBY] [DEVELOPMENT] [DURING THE MEDIUM WRITING] [STANDBY] [STANDBY] [STANDBY]

FIG. 14D

| B 1 | B 2 | B 3 | B 4 | B 5 | B 6 |
|---|---|---|---|---|---|
| # 1 2 | # 1 8 | # 2 4 | # 3 0 | # 3 6 | # 6 |
| # 1 3 | # 1 9 | # 2 5 | # 3 1 | # 3 7 | # 1 1 |
| # 1 4 | # 2 0 | # 2 6 | # 3 2 | # 3 8 | |
| # 1 5 | # 2 1 | # 2 7 | # 3 3 | # 3 9 | |
| # 1 6 | # 2 2 | # 2 8 | # 3 4 | # 4 0 | |
| # 1 7 | # 2 3 | # 2 9 | # 3 5 | # 4 1 | |
| [STANDBY] | [STANDBY] | [STANDBY] | [STANDBY] | [DEVELOPMENT] | [DURING THE MEDIUM WRITING] |

FIG. 14E

| B 1 | B 2 | B 3 | B 4 | B 5 | B 6 |
|---|---|---|---|---|---|
| # 1 2 | # 1 8 | # 2 4 | # 3 0 | # 3 6 | # 4 2 |
| # 1 3 | # 1 9 | # 2 5 | # 3 1 | # 3 7 | # 4 3 |
| # 1 4 | # 2 0 | # 2 6 | # 3 2 | # 3 8 | # 4 4 |
| # 1 5 | # 2 1 | # 2 7 | # 3 3 | # 3 9 | # 4 5 |
| # 1 6 | # 2 2 | # 2 8 | # 3 4 | # 4 0 | # 4 6 |
| # 1 7 | # 2 3 | # 2 9 | # 3 5 | # 4 1 | # 4 7 |
| [DURING THE MEDIUM WRITING] | [STANDBY] | [STANDBY] | [STANDBY] | [STANDBY] | [DEVELOPMENT] |

FIG. 14F

| B 1 | B 2 | B 3 | B 4 | B 5 | B 6 |
|-----|-----|-----|-----|-----|-----|
| #12 | #18 | #24 | #30 | #36 | #42 |
| #13 | #19 | #25 | #31 | #37 | #43 |
| #14 | #20 | #26 | #32 | #38 | #44 |
| #15 | #21 | #27 | #33 | #39 | #45 |
| #16 | #22 | #28 | #34 | #40 | #46 |
| #17 | #23 | #29 | #35 | #41 | #47 |
| [END OF WRITING] | [END OF WRITING] | [END OF WRITING] | [END OF WRITING] | [END OF WRITING] | [END OF WRITING] |

FIG. 14G

| C 1 | C 2 |
|-----|-----|
| #48 | |

[DEVELOPMENT]

FIG. 14H

| C1 | | | C2 | | |
|---|---|---|---|---|---|
| #48 | #54 | #60 | #66 | #72 | #78 |
| #49 | #55 | #61 | #67 | #73 | #79 |
| #50 | #56 | #62 | #68 | #74 | #80 |
| #51 | #57 | #63 | #69 | #75 | #81 |
| #52 | #58 | #64 | #70 | #76 | #82 |
| #53 | #59 | #65 | #71 | #77 | #83 |

[DURING THE MEDIUM WRITING]     [DEVELOPMENT · STANDBY]

FIG. 14I

| C1 | | | C2 | | |
|---|---|---|---|---|---|
| #84 | #90 | #96 | #66 | #72 | #78 |
| #85 | #91 | #97 | #67 | #73 | #79 |
| #86 | #92 | #98 | #68 | #74 | #80 |
| #87 | #93 | #99 | #69 | #75 | #81 |
| #88 | #94 | #100 | #70 | #76 | #82 |
| #89 | #95 | #101 | #71 | #77 | #83 |

[DEVELOPMENT · STANDBY]     [DURING THE MEDIUM WRITING]

FIG. 15

| | [WRITE COMMAND] | [LOGIC BLOCK ADDRESS LBA/ THE NUMBER OF BLOCKS BC] |
|---|---|---|
| ASCENDING ORDER SEQUENTIAL ACCESS 70 | #1. | WRITE:LBA=1000h/BC=10h |
| | ⁓ | ⁓ |
| | #20. | WRITE:LBA=1130h/BC=10h |
| ASCENDING ORDER RANDOM ACCESS 72 | #21. | WRITE:LBA=2000h/BC=10h |
| | #22. | WRITE:LBA=3000h/BC=10h |
| | #23. | WRITE:LBA=4000h/BC=10h |
| | #24. | WRITE:LBA=5000h/BC=10h |
| | #25. | WRITE:LBA=6000h/BC=10h |
| | #26. | WRITE:LBA=7000h/BC=10h |
| | #27. | WRITE:LBA=8000h/BC=10h |
| | #28. | WRITE:LBA=9000h/BC=10h |
| | #29. | WRITE:LBA=A000h/BC=10h |
| | #30. | WRITE:LBA=6010h/BC=10h |
| | #31. | WRITE:LBA=7010h/BC=10h |
| | #32. | WRITE:LBA=8010h/BC=10h |
| | #33. | WRITE:LBA=9010h/BC=10h |
| | #34. | WRITE:LBA=A010h/BC=10h |
| | #35. | WRITE:LBA=6020h/BC=10h |
| | ⁓ | ⁓ |
| | #n. | WRITE:LBA=****h/BC=10h |

F I G. 1 6 D
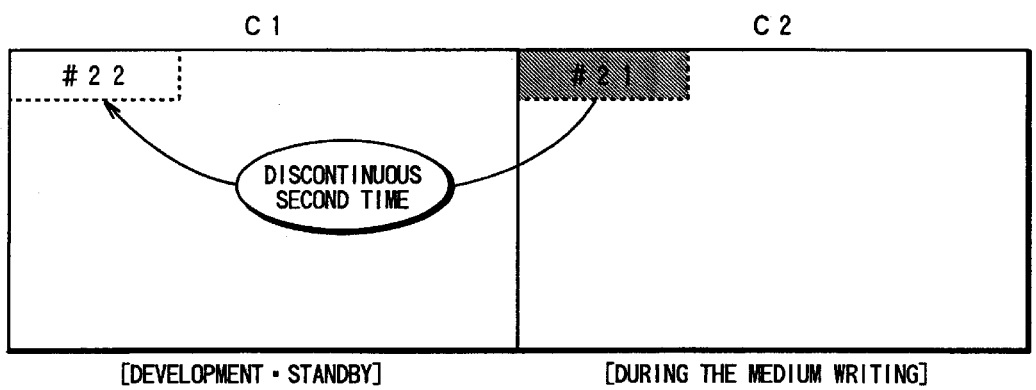
F I G. 1 6 E
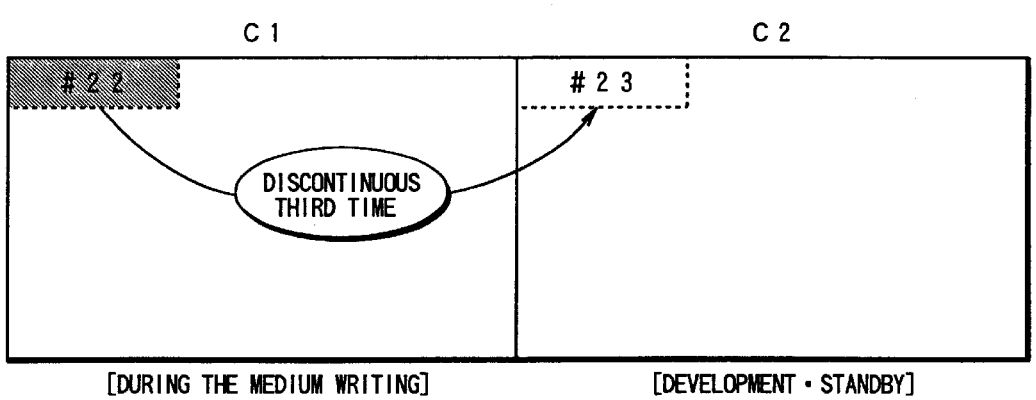

FIG. 16F

|  C1 | C2 |
|---|---|
| #22 | #23 |

[END OF THE MEDIUM WRITING]　　　[END OF THE MEDIUM WRITING]

FIG. 16G

| B1 | B2 | B3 | B4 | B5 | B6 |
|---|---|---|---|---|---|
| #24 | #25 | #26 | #27 | #28 | #29 |
|  | #30 | #31 | #32 | #33 | #34 |
|  | #35 |  |  |  |  |

[DURING THE MEDIUM WRITING]　[DEVELOPMENT]　[DEVELOPMENT]　[DEVELOPMENT]　[DEVELOPMENT]　[DEVELOPMENT]

FIG. 17

| | [WRITE COMMAND] | [LOGIC BLOCK ADDRESS LBA/ THE NUMBER OF BLOCKS BC] |
|---|---|---|
| ASCENDING ORDER RANDOM ACCESS 80 | #1. | WRITE: LBA=1000h/BC=10h |
| | #2. | WRITE: LBA=2000h/BC=10h |
| | #3. | WRITE: LBA=3000h/BC=10h |
| | #4. | WRITE: LBA=4000h/BC=10h |
| | #5. | WRITE: LBA=5000h/BC=10h |
| | #6. | WRITE: LBA=6000h/BC=10h |
| | #7. | WRITE: LBA=2010h/BC=10h |
| | #8. | WRITE: LBA=3010h/BC=10h |
| | #9. | WRITE: LBA=4010h/BC=10h |
| | #10. | WRITE: LBA=5010h/BC=10h |
| | #11. | WRITE: LBA=6010h/BC=10h |
| DESCENDING ORDER SEQUENTIAL ACCESS 82 | #12. | WRITE: LBA=9000h/BC=10h |
| | #13. | WRITE: LBA=8FF0h/BC=10h |
| | #14. | WRITE: LBA=8FE0h/BC=10h |
| | ⋮ | ⋮ |
| | #48. | WRITE: LBA=8DC0h/BC=10h |
| | ⋮ | ⋮ |
| | #n. | WRITE: LBA=****h/BC=10h |

FIG. 18A

| B1 | B2 | B3 | B4 | B5 | B6 |
|---|---|---|---|---|---|
| #1 | #2 | #3 | #4 | #5 | #6 |
|  | #7 | #8 | #9 | #10 | #11 |

[DURING THE MEDIUM WRITING] [STANDBY] [STANDBY] [STANDBY] [STANDBY] [STANDBY]

FIG. 18B

| B1 | B2 | B3 | B4 | B5 | B6 |
|---|---|---|---|---|---|
| #12 | #2 | #3 | #4 | #5 | #6 |
|  | #7 | #8 | #9 | #10 | #11 |

[DEVELOPMENT] [DURING THE MEDIUM WRITING] [STANDBY] [STANDBY] [STANDBY] [STANDBY]

FIG. 18C

| B1 | B2 | B3 | B4 | B5 | B6 |
|---|---|---|---|---|---|
| #12 | #13 | #3 | #4 | #5 | #6 |
|  |  | #8 | #9 | #10 | #11 |

[STANDBY] [DEVELOPMENT] [DURING THE MEDIUM WRITING] [STANDBY] [STANDBY] [STANDBY]

FIG. 18D

| B1 | B2 | B3 | B4 | B5 | B6 |
|---|---|---|---|---|---|
| #12 | #13 | #14 | #15 | #16 | #6 |
|  |  |  |  |  | #11 |
| [STANDBY] | [STANDBY] | [STANDBY] | [STANDBY] | [DEVELOPMENT] | [DURING THE MEDIUM WRITING] |

FIG. 18E

| B1 | B2 | B3 | B4 | B5 | B6 |
|---|---|---|---|---|---|
| #42 | #43 | #44 | #45 | #46 | #47 |
| [DURING THE MEDIUM WRITING] | [STANDBY] | [STANDBY] | [STANDBY] | [STANDBY] | [DEVELOPMENT] |

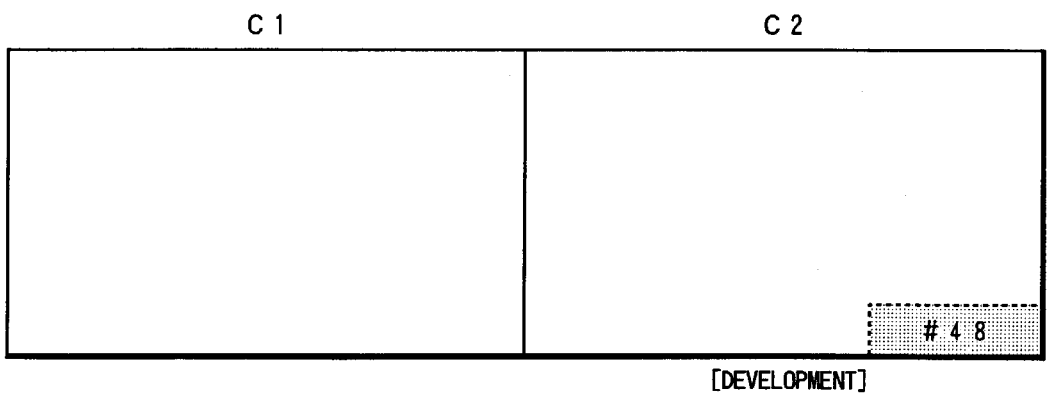

FIG. 18H

| C 1 | | | C 2 | | |
|---|---|---|---|---|---|
| #83 | #77 | #71 | #65 | #59 | #53 |
| #82 | #76 | #70 | #64 | #58 | #52 |
| #81 | #75 | #69 | #63 | #57 | #51 |
| #80 | #74 | #68 | #62 | #56 | #50 |
| #79 | #73 | #67 | #61 | #55 | #49 |
| #78 | #72 | #66 | #60 | #54 | #48 |

[DEVELOPMENT · STANDBY]　　　　[DURING THE MEDIUM WRITING]

FIG. 18I

| C 1 | | | C 2 | | |
|---|---|---|---|---|---|
| #83 | #77 | #71 | #101 | #95 | #89 |
| #82 | #76 | #70 | #100 | #94 | #88 |
| #81 | #75 | #69 | #99 | #93 | #87 |
| #80 | #74 | #68 | #98 | #92 | #86 |
| #79 | #73 | #67 | #97 | #91 | #85 |
| #78 | #72 | #66 | #96 | #90 | #84 |

[DURING THE MEDIUM WRITING]　　　　[DEVELOPMENT · STANDBY]

FIG. 19A

| | [WRITE COMMAND] | [LOGIC BLOCK ADDRESS LBA/ THE NUMBER OF BLOCKS BC] |
|---|---|---|
| ASCENDING ORDER SEQUENTIAL ACCESS 90 | #1. | WRITE:LBA=1000h/BC=10h |
| | ⋮ | ⋮ |
| | #20. | WRITE:LBA=1130h/BC=10h |
| | #21. | WRITE:LBA=A000h/BC=10h |
| | #22. | WRITE:LBA=9000h/BC=10h |
| | #23. | WRITE:LBA=9FF0h/BC=10h |
| | #24. | WRITE:LBA=8000h/BC=10h |
| | #25. | WRITE:LBA=7000h/BC=10h |
| | #26. | WRITE:LBA=6000h/BC=10h |
| | #27. | WRITE:LBA=5000h/BC=10h |
| | #28. | WRITE:LBA=4000h/BC=10h |
| | #29. | WRITE:LBA=3000h/BC=10h |
| | #30. | WRITE:LBA=6FF0h/BC=10h |
| | #31. | WRITE:LBA=5FF0h/BC=10h |
| | #32. | WRITE:LBA=4FF0h/BC=10h |
| | #33. | WRITE:LBA=3FF0h/BC=10h |
| | #34. | WRITE:LBA=2FF0h/BC=10h |
| | #35. | WRITE:LBA=6FE0h/BC=10h |
| | #36. | WRITE:LBA=5FE0h/BC=10h |
| DESCENDING ORDER RANDOM ACCESS 92 | #37. | WRITE:LBA=4FE0h/BC=10h |
| | #38. | WRITE:LBA=3FE0h/BC=10h |
| | #39. | WRITE:LBA=2FE0h/BC=10h |
| | #40. | WRITE:LBA=6FD0h/BC=10h |
| | #41. | WRITE:LBA=5FD0h/BC=10h |
| | #42. | WRITE:LBA=4FD0h/BC=10h |
| | #43. | WRITE:LBA=3FD0h/BC=10h |
| | #44. | WRITE:LBA=2FD0h/BC=10h |
| | #45. | WRITE:LBA=6FC0h/BC=10h |
| | #46. | WRITE:LBA=5FC0h/BC=10h |
| | #47. | WRITE:LBA=4FC0h/BC=10h |
| | #48. | WRITE:LBA=3FC0h/BC=10h |
| | #49. | WRITE:LBA=2FC0h/BC=10h |
| | #50. | WRITE:LBA=6FB0h/BC=10h |
| | #51. | WRITE:LBA=5FB0h/BC=10h |
| | #52. | WRITE:LBA=4FB0h/BC=10h |
| | #53. | WRITE:LBA=3FB0h/BC=10h |
| | #54. | WRITE:LBA=2FB0h/BC=10h |
| | #55. | WRITE:LBA=6FA0h/BC=10h |

FIG. 19B

| | | |
|---|---|---|
| | #56. | WRITE:LBA=5FA0h/BC=10h |
| | #57. | WRITE:LBA=4FA0h/BC=10h |
| | #58. | WRITE:LBA=3FA0h/BC=10h |
| | #59. | WRITE:LBA=2FA0h/BC=10h |
| | #60. | WRITE:LBA=6F90h/BC=10h |
| | #61. | WRITE:LBA=5F90h/BC=10h |
| | #62. | WRITE:LBA=4F90h/BC=10h |
| | #63. | WRITE:LBA=3F90h/BC=10h |
| | #64. | WRITE:LBA=2F90h/BC=10h |
| | #65. | WRITE:LBA=6F80h/BC=10h |
| | #66. | WRITE:LBA=5F80h/BC=10h |
| | #67. | WRITE:LBA=4F80h/BC=10h |
| | #68. | WRITE:LBA=3F80h/BC=10h |
| | #69. | WRITE:LBA=2F80h/BC=10h |
| | #70. | WRITE:LBA=6F70h/BC=10h |
| | #71. | WRITE:LBA=5F70h/BC=10h |
| | #72. | WRITE:LBA=4F70h/BC=10h |
| DESCENDING | #73. | WRITE:LBA=3F70h/BC=10h |
| ORDER | #74. | WRITE:LBA=2F70h/BC=10h |
| RANDOM | #75. | WRITE:LBA=6F60h/BC=10h |
| ACCESS 92 | #76. | WRITE:LBA=5F60h/BC=10h |
| | #77. | WRITE:LBA=4F60h/BC=10h |
| | #78. | WRITE:LBA=3F60h/BC=10h |
| | #79. | WRITE:LBA=2F60h/BC=10h |
| | #80. | WRITE:LBA=6F50h/BC=10h |
| | #81. | WRITE:LBA=5F50h/BC=10h |
| | #82. | WRITE:LBA=4F50h/BC=10h |
| | #83. | WRITE:LBA=3F50h/BC=10h |
| | #84. | WRITE:LBA=2F50h/BC=10h |
| | #85. | WRITE:LBA=6F40h/BC=10h |
| | #86. | WRITE:LBA=5F40h/BC=10h |
| | #87. | WRITE:LBA=4F40h/BC=10h |
| | #88. | WRITE:LBA=3F40h/BC=10h |
| | #89. | WRITE:LBA=2F40h/BC=10h |
| | #90. | WRITE:LBA=6F30h/BC=10h |
| | #91. | WRITE:LBA=5F30h/BC=10h |
| | #92. | WRITE:LBA=4F30h/BC=10h |
| | #93. | WRITE:LBA=3F30h/BC=10h |
| | ⋮ | |
| | #n. | WRITE:LBA=\*\*\*\*h/BC=10h |

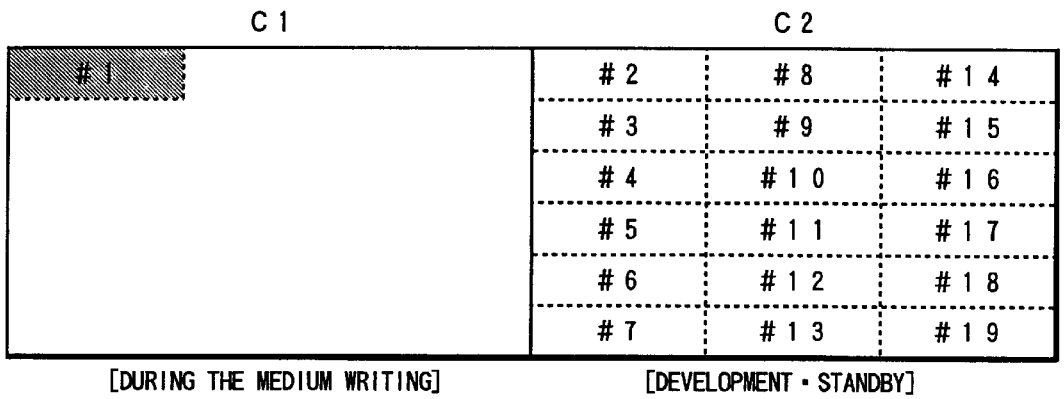
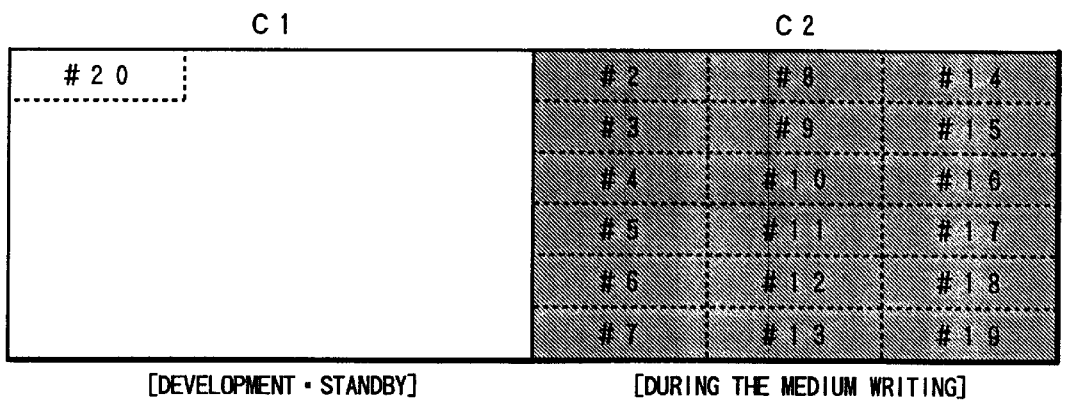
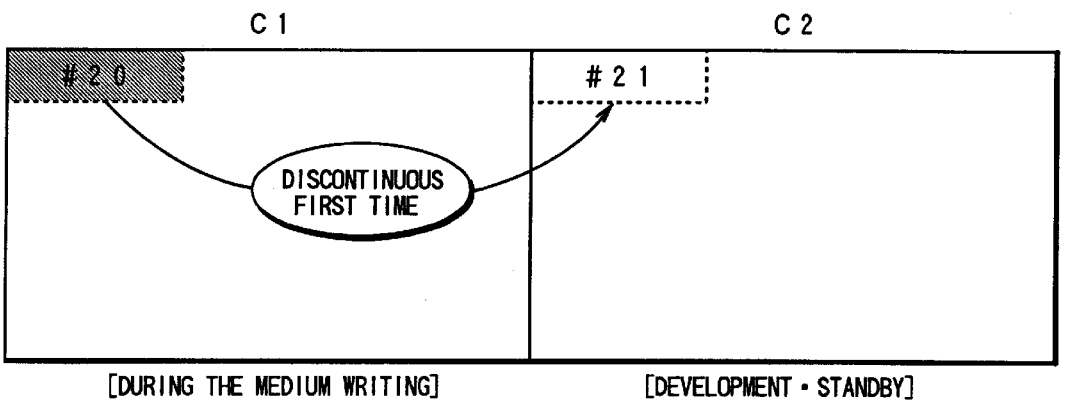

FIG. 20O

| B1 | B2 | B3 | B4 | B5 | B6 |
|---|---|---|---|---|---|
| #36 | #37 | #32 | #33 | #34 | #35 |
| [STANDBY] | [DEVELOPMENT] | [DURING THE MEDIUM WRITING] | [STANDBY] | [STANDBY] | [STANDBY] |

FIG. 20P

| B1 | B2 | B3 | B4 | B5 | B6 |
|---|---|---|---|---|---|
| #61 | #62 |  | #58 | #59 | #60 |
| #56 | #57 |  | #53 | #54 | #55 |
| #51 | #52 |  | #48 | #49 | #50 |
| #46 | #47 |  | #43 | #44 | #45 |
| #41 | #42 |  | #38 | #39 | #40 |
| #36 | #37 | #32 | #33 | #34 | #35 |
| [DEVELOPMENT] | [DEVELOPMENT] | [DURING THE MEDIUM WRITING] | [DEVELOPMENT] | [DEVELOPMENT] | [DEVELOPMENT] |

FIG. 20Q

| B1 | B2 | B3 | B4 | B5 | B6 |
|---|---|---|---|---|---|
| #61 | #62 |  | #58 | #59 | #60 |
| #56 | #57 |  | #53 | #54 | #55 |
| #51 | #52 |  | #48 | #49 | #50 |
| #46 | #47 |  | #43 | #44 | #45 |
| #41 | #42 |  | #38 | #39 | #40 |
| #36 | #37 | #63 | #33 | #34 | #35 |
| [DEVELOPMENT] | [DEVELOPMENT] | [DEVELOPMENT] | [DURING THE MEDIUM WRITING] | [DEVELOPMENT] | [DEVELOPMENT] |

FIG. 20R

| B1 | B2 | B3 | B4 | B5 | B6 |
|---|---|---|---|---|---|
| #61 | #62 |  |  | #59 | #60 |
| #56 | #57 |  |  | #54 | #55 |
| #51 | #52 |  |  | #49 | #50 |
| #46 | #47 |  |  | #44 | #45 |
| #41 | #42 |  |  | #39 | #40 |
| #36 | #37 | #63 | #64 | #34 | #35 |
| [DEVELOPMENT] | [DEVELOPMENT] | [DEVELOPMENT] | [DEVELOPMENT] | [DURING THE MEDIUM WRITING] | [DEVELOPMENT] |

FIG. 20S

| B1 | B2 | B3 | B4 | B5 | B6 |
|---|---|---|---|---|---|
| #61 | #62 |  |  |  | #60 |
| #56 | #57 |  |  |  | #55 |
| #51 | #52 |  |  |  | #50 |
| #46 | #47 |  |  |  | #45 |
| #41 | #42 |  |  |  | #40 |
| #36 | #37 | #63 | #64 | #65 | #35 |
| [DEVELOPMENT] | [DEVELOPMENT] | [DEVELOPMENT] | [DEVELOPMENT] | [DEVELOPMENT] | [DURING THE MEDIUM WRITING] |

FIG. 20T

| B1 | B2 | B3 | B4 | B5 | B6 |
|---|---|---|---|---|---|
| #61 | #62 | | | | |
| #56 | #57 | | | | |
| #51 | #52 | | | | |
| #46 | #47 | | | | |
| #41 | #42 | | | | |
| #36 | #37 | #63 | #64 | #65 | #66 |

[DURING THE MEDIUM WRITING] [DEVELOPMENT] [DEVELOPMENT] [DEVELOPMENT] [DEVELOPMENT] [DEVELOPMENT]

FIG. 20U

| B1 | B2 | B3 | B4 | B5 | B6 |
|---|---|---|---|---|---|
| | #62 | | | | |
| | #57 | | | | |
| | #52 | | | | |
| | #47 | | | | |
| | #42 | | | | |
| #67 | #37 | #63 | #64 | #65 | #66 |

[DEVELOPMENT] [DURING THE MEDIUM WRITING] [DEVELOPMENT] [DEVELOPMENT] [DEVELOPMENT] [DEVELOPMENT]

FIG. 20V

| B1 | B2 | B3 | B4 | B5 | B6 |
|---|---|---|---|---|---|
| #92 | #93 | | #89 | #90 | #91 |
| #87 | #88 | | #84 | #85 | #86 |
| #82 | #83 | | #79 | #80 | #81 |
| #77 | #78 | | #74 | #75 | #76 |
| #72 | #73 | | #69 | #70 | #71 |
| #67 | #68 | #63 | #64 | #65 | #66 |

[DEVELOPMENT] [DEVELOPMENT] [DURING THE MEDIUM WRITING] [DEVELOPMENT] [DEVELOPMENT] [DEVELOPMENT]

STORING APPARATUS HAVING A DYNAMIC BUFFER FOR RANDOM OR SEQUENTIAL ACCESS

BACKGROUND OF THE INVENTION

1. Field of the Invention

The present invention relates to a storing apparatus having a cache function for developing write data into a data buffer area in response to a write access of a host, notifying of a normal end, and writing back the write data in the data buffer area into a storing medium. More particularly, the invention relates to a storing apparatus for dynamically changing a buffer construction in accordance with a random access and a sequential access from a host.

2. Description of the Related Arts

Attention is paid to an optical disk as a storing medium serving as a nucleus of multimedia which has rapidly been developing in recent years. For example, as for an MO cartridge of 3.5 inches, MO cartridges of 128 MB, 230 MB, 540 MB, 640 MB, and the like are provided. An optical disk drive using such an MO cartridge is provided as an external storing apparatus of a personal computer. The optical disk drive is, however, known as an apparatus which takes longer time in the writing operation as compared with the reading operation. That is, in the reading operation of the optical disk, a laser beam of an optical head is sought to a target track (on-track), data as a target is read during one rotation of the medium in the on-track state, and the read data can be responded to the host. On the contrary, the writing operation of the optical disk needs operations for erasing, writing, and verification reading corresponding to three rotations of the medium in the on-track state where the laser beam of the optical head is sought to the target track, so that the writing operation takes time. Although there is also a direct over-write corresponding optical disk in which the erasing and writing operations can be simultaneously performed, a writing time corresponding to two rotations of the medium including the verification reading is necessary. In the storing apparatus in which the writing operation is slower than the reading operation as mentioned above, there is provided a cache control function such that when a write access is received from the host, the write data is developed into a data buffer area in a memory, a normal end is notified to the host, the writing operation is finished when it is seen from the host, and after that, the write data developed in the data buffer area is written into a storing medium. In such a conventional cache control function, for example, when it is predicted that a frequency of the sequential access in which write addresses continue is high as a write access from the host, a buffer construction such that a data buffer area in the memory is set to a single section is set by a setup process of the storing apparatus. With such a buffer construction of the single section, after the continuous write data was developed into the buffer by the sequential access of the host of an amount corresponding to the data buffer area, the write data can be written into the medium in a lump. The number of seeking times when the write data developed in the data buffer area is written back to the medium is reduced and whole access performance can be enhanced. When it is predicted that the frequency of the random access in which the write addresses are discontinuous as a write access from the host is high, a buffer construction such that the data buffer area in the memory is divided into sections as many as possible by the setup process of the storing apparatus is set. With such a buffer construction in which the number of sections is large, an empty section can be efficiently prepared for the random access of the host, so that the write data can be developed into the empty section without waiting for an empty buffer section and the write access when it is seen from the host can be promptly and normally finished.

In recent years, however, there is a case where a plurality of hosts are connected to one storing apparatus and the storing apparatus is used as common resources, and the frequency of the sequential access and that of the random access are different depending on the host. On the contrary, the buffer construction of the storing apparatus is fixedly determined to either the sequential correspondence or the random correspondence. Consequently, when the write access from the host which is not adapted to the buffer construction frequently occurs, there is a problem such that the write data in a write waiting state to the medium remains in the data buffer area, the write access of the host becomes slow due to the waiting for the empty section in the buffer, and the whole access performance deteriorates. In order to reconcile the sequential access and the random access, a method of setting the number of sections in the data buffer area to the intermediate number between the number of sections of the sequential access and that of the random access. In this case, however, the efficiency deteriorates for both of the sequential access and the random access and the whole access performance is not improved.

SUMMARY OF THE INVENTION

According to the invention, there is provided a storing apparatus in which an access efficiency is raised by optimizing a buffer construction for both of a random access and a sequential access from a host.

A storing apparatus of the invention comprises a cache control unit, an access kind discriminating unit, and a buffer construction control unit. When a write access is received from an upper apparatus, the cache control unit develops write data into a data buffer area in a memory, notifies the upper apparatus of a normal end, and after that, writes the write data developed in the data buffer area into a storing medium. The access kind discriminating unit discriminates whether the write access of the upper apparatus is a random access in which write addresses are discontinuous or a sequential access in which the write addresses are continuous. The buffer construction control unit sets either a random corresponding buffer construction which enables a buffer development and a medium writing that are suitable for the random access or a sequential corresponding buffer construction which enables a buffer development and a medium writing that are suitable for the sequential write access. When the sequential access is decided in a setting state of the random corresponding buffer construction, the buffer construction control unit changes the construction to the sequential corresponding buffer construction. When the random access is decided in a setting state of the sequential corresponding buffer construction, the buffer construction control unit changes the construction to the random corresponding buffer construction. In the storing apparatus of the invention, therefore, whether the write access from the host is the sequential access or the random access is analyzed, the data buffer construction having the optimum number of sections is selected in accordance with the access kind, and the caching operation is executed, thereby optimizing the buffer development and the medium writing in response to the write access of the host and improving the efficiency. For example, when the host performs the sequential access, the number of sections in the data buffer area is reduced and the operation is executed, thereby increasing a write data amount per time to the medium and reducing the number of times of the writing to the medium. On the contrary, when the host executes the random access, by increasing the number of sections in the data buffer area, the buffer is efficiently developed. Even in case of the random access, by developing the write data of the continuous addresses every section, the number of times of the writing to the medium is reduced. When the write data amount by the sequential access reaches a predetermined value in the setting state of the random corresponding buffer construction, the buffer construction control unit changes the data buffer area from the random corresponding buffer construction to the sequential corresponding buffer construction. For example, when the write data amount by the sequential write access reaches a capacity of the data buffer area, the buffer construction control unit changes the data buffer area from the random corresponding buffer construction to the sequential corresponding buffer construction. When the number of times of the random write access reaches a specified number in the setting state of the sequential corresponding buffer construction, the buffer construction control unit changes the data buffer area from the sequential corresponding buffer construction to the random corresponding buffer construction. For example, when the number of random write accessing times reaches three times, the buffer construction control unit changes the data buffer area from the sequential corresponding buffer construction to the random corresponding buffer construction. By providing a limitation to the changing conditions of the sequential correspondence and the random correspondence of the buffer construction, the change in the number of buffer sections which cannot expect a write effect such that as soon as the number of sections in the data buffer is reduced since the sequential accesses from the host continue, the random accesses continue and the data buffer is returned to the original data buffer having a large number of sections is eliminated. The buffer construction change in which a continuation of the random access and a continuation of the sequential access from the host are predicted is performed.

When an ascending order access in which an address of this time increases from the previous address is decided in addition to the discrimination of the random or sequential access, the access kind discriminating unit sets an ascending order mode. When a descending order access in which the address of this time decreases from the previous address is decided, a descending order mode is set. In this case, the cache control unit develops the write data from the head position in the buffer section in accordance with the ascending order in the ascending order mode. The cache control unit develops the write data from the end position in the buffer section in accordance with the descending order in the descending order mode. When a value obtained by adding "1" to the end address of the previous write access coincides with the head address of the write access of this time, that is, when (previous end address)+1=(present end address), the access kind discriminating unit determines that the write access is the sequential access in the ascending order. When the head address of the previous write access coincides with a value obtained by adding "1" to the end address of the present write access, namely, when (previous head address) =(present end address)+1, the access kind discriminating unit decides that the write access is the sequential access in the descending order.

The access kind discriminating unit switches the ascending order mode and the descending order mode in the random access as follows.

I. When it is determined that the present mode is the ascending order mode and the write access is the descending order random access, the mode is changed to the descending order mode and the write data is developed into the buffer section in the descending order.

II. When it is decided that the present mode is the descending order mode and the write access is the random access in the ascending order, the mode is switched to the ascending order mode and the write data is developed into the buffer section in the ascending order.

The access kind discriminating unit switches the ascending order mode and the descending order mode in the sequential access as follows.

I. When it is determined that the present mode is the ascending order mode and the write access is the sequential access in the descending order, the number of times of the continuous sequential access in the descending order is counted. When the number is smaller than a specified number of times, the ascending order mode is maintained and the write data is developed into the buffer section in the ascending order. When the number of times reaches the specified number, the ascending order mode is switched to the descending order mode and the write data is developed into the buffer section in the descending order.

II. When it is determined that the present mode is the descending order mode and the write access is the sequential access in the ascending order, the number of times of the continuous sequential access in the ascending order is counted. When the number of times is smaller than a specified number of times, the descending order mode is maintained and the write data is developed into the buffer section in the descending order. When the number of times reaches the specified number of times, the mode is switched to the ascending order mode and the write data is developed into the buffer section in the ascending order.

By discriminating the ascending or descending order of the write access and accordingly developing the write data into the buffer in the ascending or descending order, the buffer development and medium writing of the write data can be efficiently executed. The buffer construction control unit divides the data buffer area into, for example, two sections C1 and C2 as a sequential corresponding buffer construction. While new write data is being developed into the one section C1 in response to the sequential access of an upper apparatus, the cache control unit writes the developed write data from the other section C2 into the medium in a lump. The buffer construction control unit divides the data buffer area into a plurality of sections exceeding two, for example, into six sections B1 to B6 as a random corresponding buffer construction. In response to the random access of the upper apparatus, when write data in which addresses are continuous has been developed in any of the divided sections and continuous regions are empty, the cache control unit develops new write data subsequent to the developed data. When the write data in which addresses are continuous does not exist in any one of the divided sections or even if such data exists, there is no empty continuous region, the cache control unit waits for an empty section by the end of medium writing to any one of the sections and develops new write data into the section to which the writing has been finished. The cache control unit manages the writing of the write data developed in the data buffer area into the medium by an LRU algorithm. The storing medium is an optical storing medium for optically recording and reproducing information.

Further, according to the invention, there is provided a storing apparatus for discriminating an ascending order or a descending order of a write access and switching the buffer development in a fixed state of a buffer construction. This storing apparatus comprises: a data buffer area in a memory in which a random corresponding buffer construction which enables a buffer development and a medium writing that are suitable for a random write access is fixedly set; and a cache control unit for developing write data into the data buffer area in the memory when an access is received from an upper apparatus, notifying the upper apparatus of a normal end, and after that, writing the write data developed in the data buffer area into a storing medium. According to the invention, the storing apparatus has an access kind discriminating unit for setting an ascending order mode when an ascending order access in which a present address increases from a previous address is decided and setting a descending order mode when a descending order access in which the present address decreases from the previous address is decided. In the ascending order mode, the cache control unit develops the write data from the head position in the buffer section in the ascending order. In the descending order mode, the cache control unit develops the write data from the end area in the buffer section in the descending order. According to the invention, there is also provided a storing apparatus comprising: a data buffer area in a memory in which a sequential corresponding buffer construction which enables a buffer development and a medium writing that are suitable for a sequential write access is fixedly set; and a cache control unit for developing write data into the data buffer area in the memory when an access is received from an upper apparatus, notifying the upper apparatus of a normal end, and after that, writing the write data developed in the data buffer area into a storing medium. Similarly, the storing apparatus has an access kind discriminating unit for setting an ascending order mode when an ascending order access in which a present address increases from a previous address is decided and setting a descending order mode when a descending order access in which the present address decreases from the previous address is decided. In the ascending order mode, the cache control unit develops the write data from the head position in the buffer section in the ascending order. In the descending order mode, the cache control unit develops the write data from the end region in the buffer section in the descending order. In this case, the access kind discriminating unit counts the number of continuous times of the sequential access in the descending order of a state in the ascending order mode, maintains the ascending order mode, develops the write data into the buffer section in the ascending order when the number of times is smaller than a specified number of times, for instance, three times, switches the mode to the descending order mode when the number of times reaches the specified number of times, and develops the write data into the buffer section in the descending order. When the number of continuous sequential accessing times in the ascending order is counted in a state of the descending order mode and the number of times is smaller than a specified number of times, for example, three times, the descending order mode is maintained and the write data is developed into the buffer section in the descending order. When the number of times reaches the specified number of times, the mode is switched to the ascending order mode and the write data is developed into the buffer section in the ascending order.

The above and other objects, features, and advantages of the present invention will become more apparent from the following detailed description with reference to the drawings.

BRIEF DESCRIPTION OF THE DRAWINGS

FIGS. 8A and 8B are flowcharts for a random writing process in FIG. 6;

FIGS. 9A to 9C are explanatory diagrams for an ascending order buffer development and a descending order buffer development in a random access in FIGS. 8A and 8B;

FIGS. 11A and 11B are explanatory diagrams of an ascending order buffer development and a descending order buffer development in a sequential access in FIGS. 10A and 10B;

FIG. 13 is an explanatory diagram of a write command train which changes from an ascending order random access to an ascending order sequential access;

FIGS. 14A to 14I are explanatory diagrams for a buffer development, a standby, and a medium writing of write commands #1 to #101 in FIG. 13;

FIG. 15 is an explanatory diagram of a write command train which changes from the ascending order sequential access to the ascending order random access;

FIGS. 16A to 16G are explanatory diagrams of a buffer development, a standby, and a medium writing of write commands #1 to #35 in FIG. 15;

FIG. 17 is an explanatory diagram of a write command train which changes from an ascending order random access to a descending order sequential access;

FIGS. 18A to 18I are explanatory diagrams of a buffer development, a standby, and a medium writing of write commands #1 to #101 in FIG. 17;

FIGS. 19A and 19B are explanatory diagrams of a write command train which changes from the ascending order sequential access to the descending order random access.

DETAILED DESCRIPTION OF THE PREFERRED EMBODIMENT (Apparatus construction)

Figure 1:
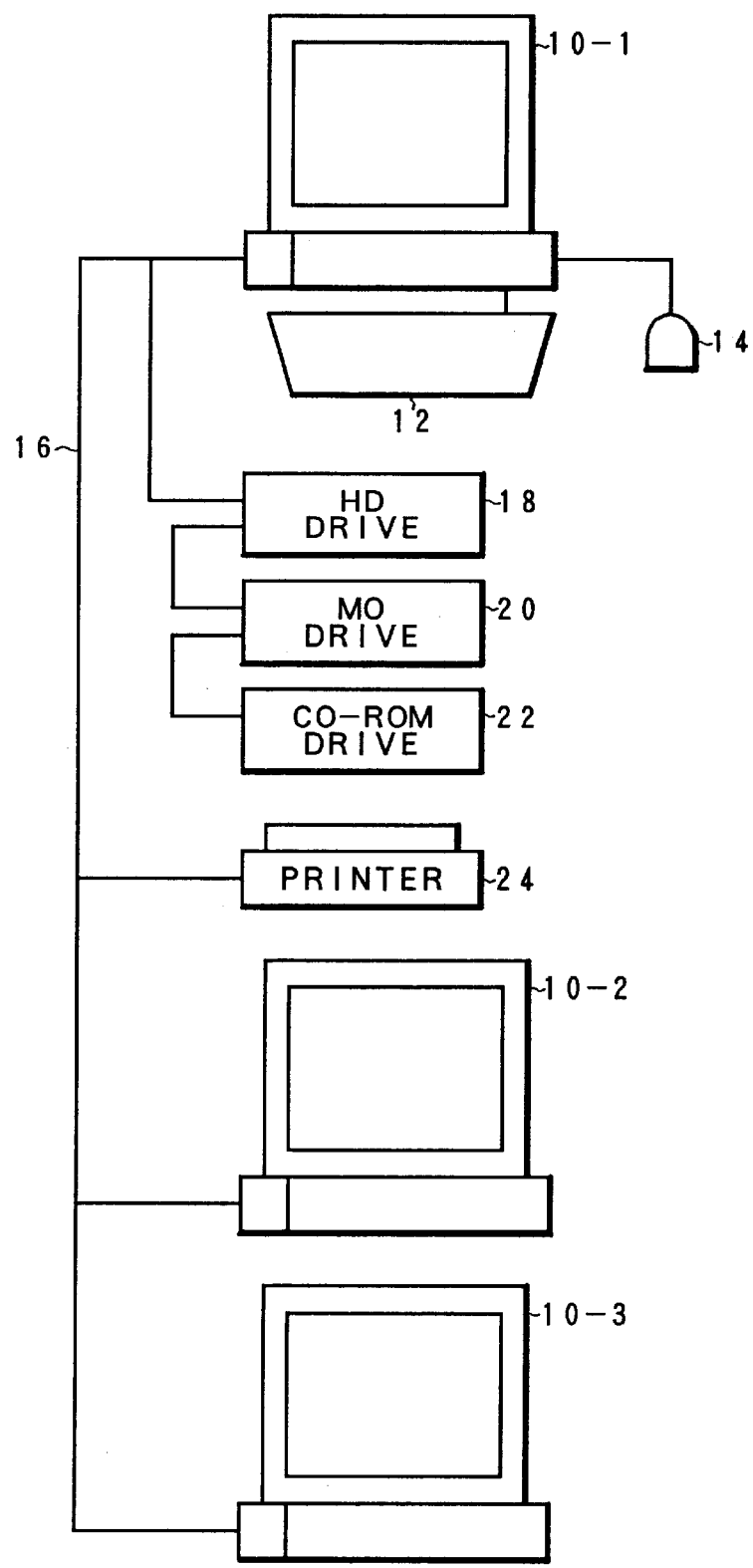
FIG. 1 is a block diagram of a computer system in which a storing apparatus of the invention is used.

FIG. 1 is an example of a computer system using a storing apparatus of the invention. A host 10-1 using a personal computer has a keyboard 12 and a mouse 14.

A hard disk drive (HD drive) 18, a magnetooptic disk drive (MO drive) 20, a CD-ROM drive 22, and a printer 24 are connected as external input/output devices to a bus 16 such as an SCSI or the like. Further, hosts 10-2 and 10-3 likewise using personal computers are connected to the bus 16 of the host 10-1 and commonly use the input/output devices of the host 10-1. The storing apparatus of the invention relates to, for example, the MO drive 20 as a target, is subjected to a write access and a read access by the hosts 10-1 to 10-3, and performs a cache control using a data buffer area assured in a memory. A cache control function of the MO drive 20 is provided to efficiently finish a write access which needs the operating time for three rotations of the medium or two rotations of the medium. When there is a write access from the host, the write data is merely developed into a data buffer area and the write access is notified to the host as a normal end. The write data developed in the data buffer area of the MO drive 20 is, after that, subjected to a write-back operation to write it onto an MO medium. In the following description, the operation to write the write data into the data buffer area is called a "development of the write data" and the operation to write the write data developed in the data buffer onto the medium is referred to as a "medium writing (write back)".

Figure 2A:
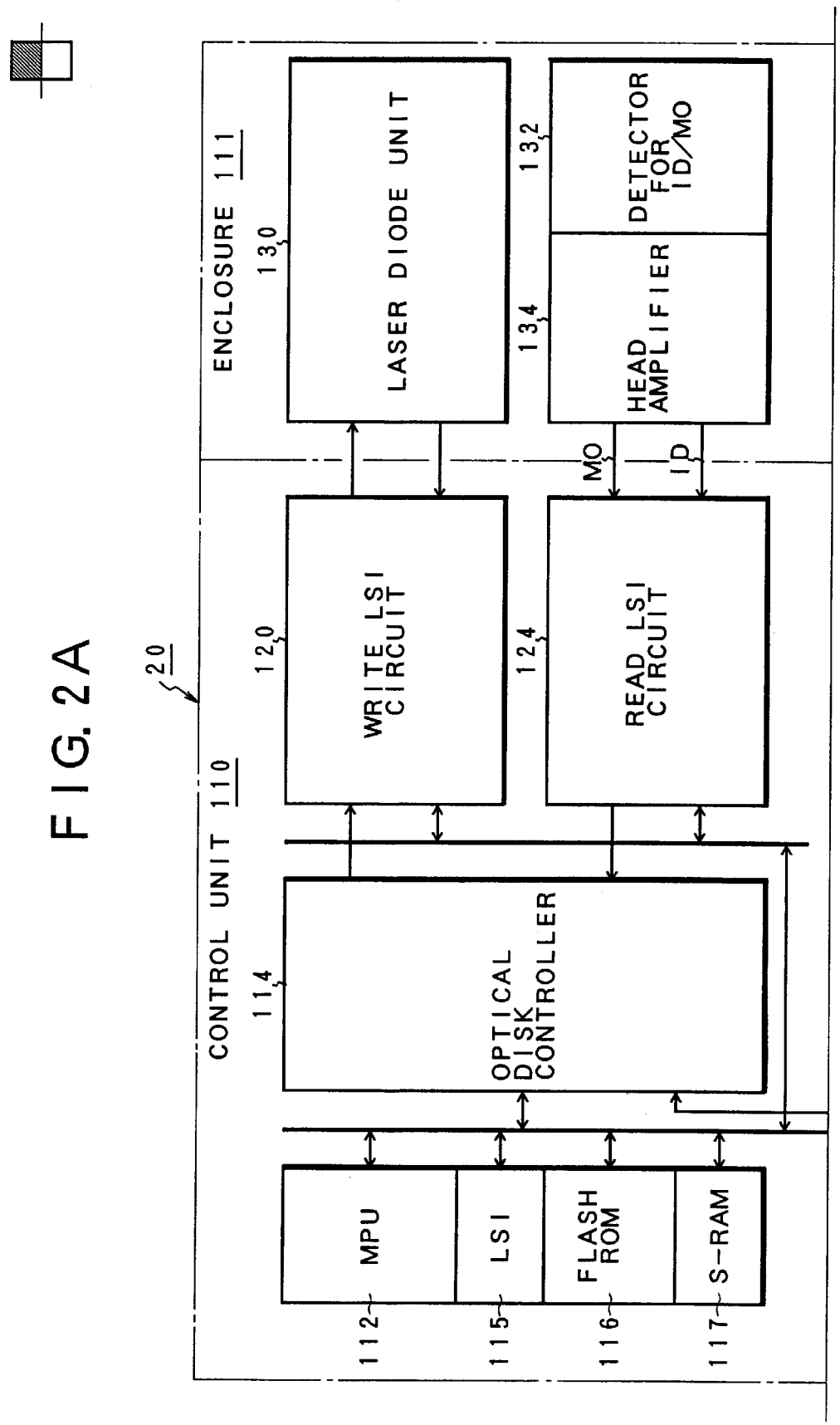
FIGS. 2A and 2B are block diagrams of an MO drive in FIG. 1.
Figure 2B:
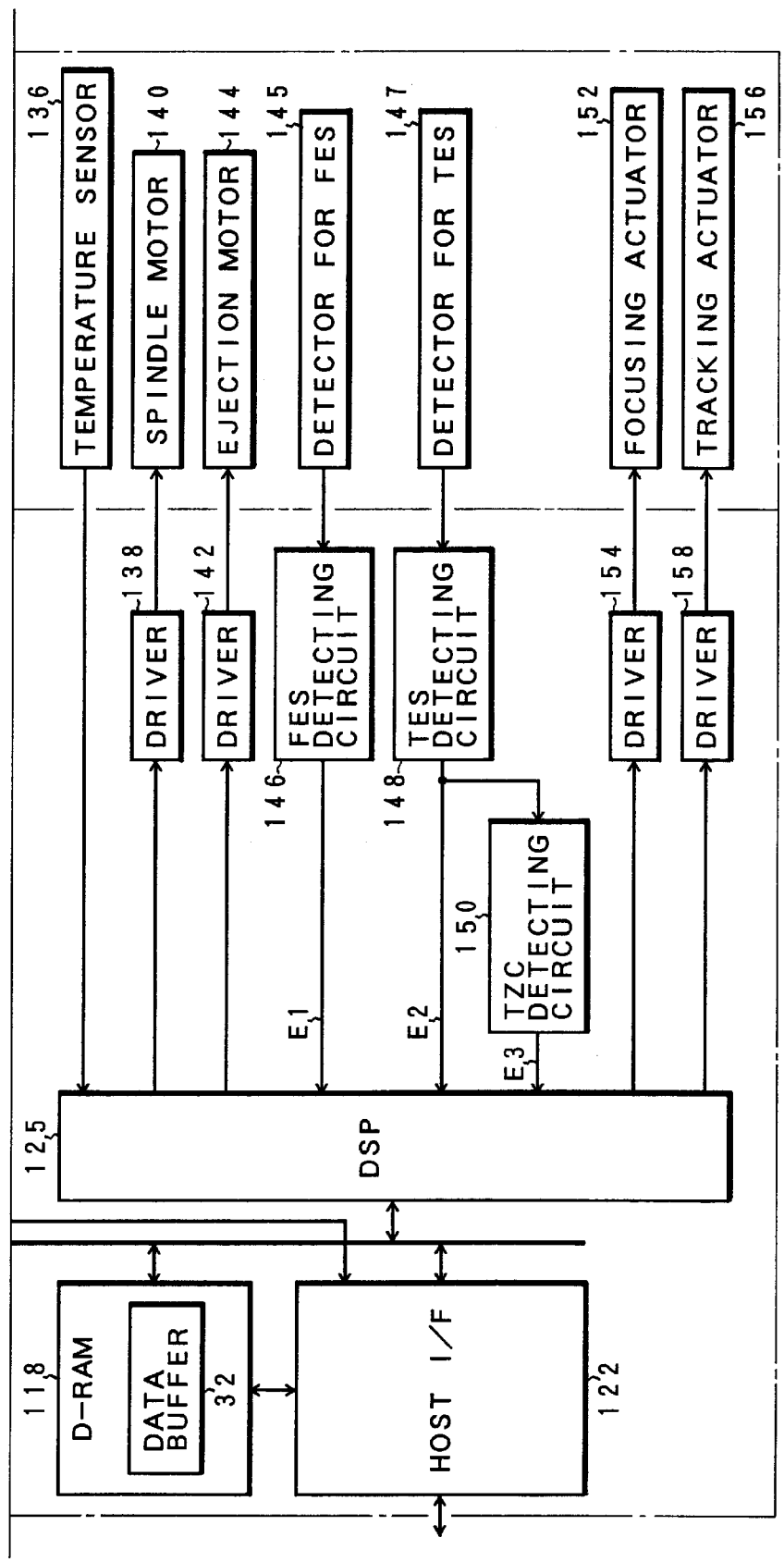

FIGS. 2A and 2B are block diagrams of the MO drive 20 in FIG. 1. The MO drive 20 is constructed by a control unit 110 and an enclosure 111. The control unit 110 comprises: an MPU 112 to perform a whole control of the optical disk drive; an interface 122 to transmit and receive commands and data to/from an upper apparatus; an optical disk controller (ODC) 114 to perform processes which are necessary to write and read data to/from the optical disk medium; and a DSP 125. A control logic 115, a flash ROM 116, an S-RAM 117, and a D-RAM 118 are provided for the MPU 112. The D-RAM 118 functions as a buffer memory and a data buffer area 32 which is used in the cache control of the invention is assured in the D-RAM 118. After an ECC code was formed on a sector unit basis from NRZ write data, the optical disk controller 114 converts it into, for example, a 1-7 RLL code. At the time of a read access, read data of the sector unit is 1-7 RLL inverse converted and is subsequently subjected to error detection and correction by an ECC code, and NRZ read data is transferred to the upper apparatus. A write LSI circuit 120 is provided for the optical disk controller 114. A laser diode control output from the write LSI circuit 120 is supplied to a laser diode unit 130 provided in an optical unit on the enclosure 111 side. The ordinary recording operation of the MO cartridge medium needs processing time for three rotations of the medium for the erasing, writing, and verification reading operations. The recording operation of the direct overwrite corresponding MO cartridge medium needs processing time for two rotations of the medium for the writing and verification reading operations. The recording operation for the medium mainly executes a medium writing process of the write data developed in response to the write access from the host into the data buffer area 32 assured in the D-RAM 118 by the cache control function of the MPU 112. As a reading system for the optical disk controller 114, a read LSI circuit 124 is provided and a read demodulating circuit and a frequency synthesizer are built in the read LSI circuit. A photosensing signal of the return light of the beam from a laser diode by a detector 132 for ID/MO provided for the enclosure 111 is inputted as an ID signal and an MO signal to the read LSI circuit 124 through a head amplifier 134. Circuit functions of an AGC circuit, a filter, a sector mark detecting circuit, and the like are provided for the read demodulating circuit of the read LSI circuit 124. A read clock and read data are formed from the inputted ID signal and MO signal. PPM data or PWM data is demodulated to the original NRZ data. The read data demodulated by the read LSI circuit 124 is supplied to the reading system of the optical disk controller 114 and is transferred as an NRZ data stream to the upper apparatus.

A detection signal of a temperature sensor 136 provided on the enclosure 111 side is inputted to the MPU 112 via the DSP 125. The MPU 112 controls each of the light emitting powers for reading, writing, and erasing of the laser diode to the optimum value on the basis of an environmental temperature of the units in the apparatus detected by the temperature sensor 136. The MPU 112 controls a spindle motor 140 provided on the enclosure 111 side by a driver 138 via the DSP 125. The MPU 112 also controls a driver 142 via the DSP 125 when the MO cartridge is ejected, thereby driving an ejection motor 144 and ejecting the MO cartridge. The DSP 125 executes a seek control and a track tracing control for seeking the laser beam to the target track (on-track). To realize a servo function of the DSP 125, a detector 145 for FES to receive the beam return light from the medium is provided for the optical unit on the enclosure 111 side. An FES detecting circuit (focusing error signal detecting circuit) 146 forms a focusing error signal E1 from a photosensing output of the detector 145 for FES and supplies to the DSP 125. A detector 147 for TES to receive the beam return light from the medium is provided in the optical unit on the enclosure 111 side. A TES detecting circuit (tracking error signal detecting circuit) 148 forms a tracking error signal E2 from a photosensing output of the detector 147 for TES and supplies to the DSP 125. The tracking error signal E2 is inputted to a TZC detecting circuit (track zero-cross point detecting circuit) 150, by which a track zero-cross pulse E3 is formed and inputted to the DSP 125. Further, to control a position of a beam spot on the medium, the DSP 125 controls a focusing actuator 152 and a tracking actuator 156 through drivers 154 and 158.

Figure 3:
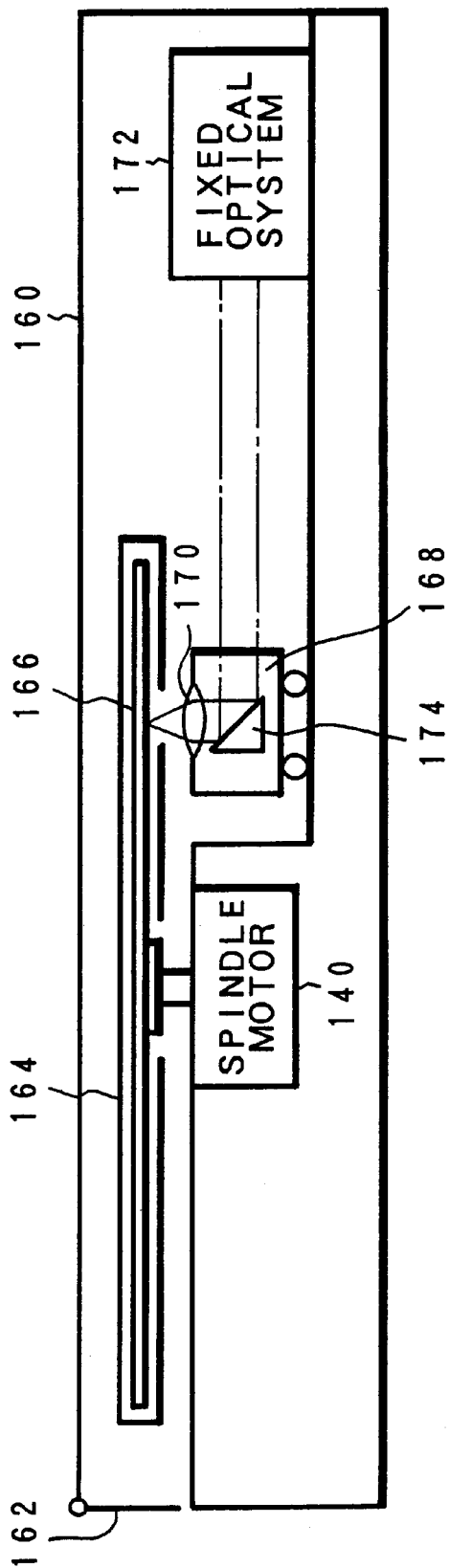
FIG. 3 is a schematic explanatory diagram of a structure of an enclosure in FIGS. 2A and 2B.

An outline of the enclosure 111 in the optical disk drive is as shown in FIG. 3. The spindle motor 140 is provided in a housing 160. By inserting an MO cartridge 164 from an inlet door 162 side to a hub of a rotary shaft of the spindle motor 140, an internal MO medium 166 is attached to the hub of the rotary shaft of the spindle motor 140 and is loaded. A carriage 168 which is movable in the direction traversing the tracks on the medium by a tracking actuator using a VCM or the like is provided under the MO medium 166 of the loaded MO cartridge 164. An objective lens 170 is mounted on the carriage 168, enters the laser beam from the laser diode provided for a fixed optical system 172 through a leading mirror 174, and forms a beam spot image onto the medium surface of the MO medium 166. The objective lens 170 is moved in the optical axial direction by the focusing actuator 152 in FIGS. 2A and 2B and can be moved in the radial direction traversing the tracks of the medium by a linear driving of the carriage 168 by the tracking actuator 156. As a tracking actuator 156, in addition to the linear driving of the carriage 168, there is also a tracking actuator to which a lens actuator for controlling the optical axis of the objective lens 170 on the carriage 168 is added.

(Access Kind and Buffer Development)

Figure 4:
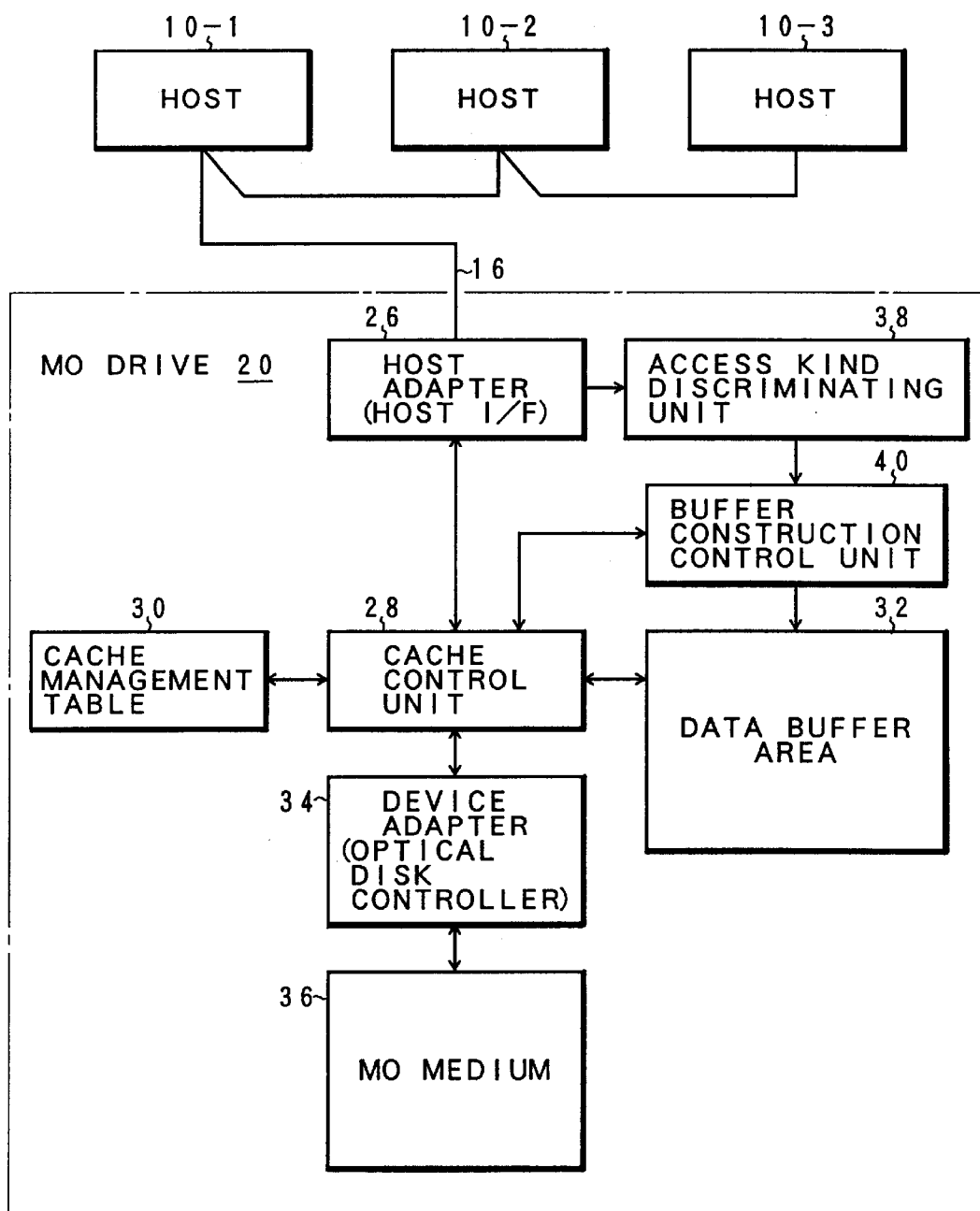
FIG. 4 is a functional block diagram of a cache control function in the MO drive in FIGS. 2A and 2B.

FIG. 4 is a functional block diagram of a cache control of the present invention which is realized by the control unit 110 of the MO drive 20 in FIGS. 2A and 2B. The MO drive 20 comprises: a host adapter 26; a cache control unit 28; a cache management table 30; the data buffer area 32; a device adapter 34; an access kind discriminating unit 38; a buffer construction control unit 40; and a storing medium 36. For example, the three hosts 10-1 to 10-3 are connected to the host adapter 26 through the bus 16 such as an SCSI or the like. The host adapter 26 receives a write command or a read command from the hosts 10-1 to 10-3, analyzes the contents of the command, and transfers to the cache control unit 28.

The write command from the host includes at least a write address and a write data amount as command parameters. Specifically speaking, on the hosts 10-1 to 10-3 side, a memory area of the MO drive 20 is managed as an address space of a logic block address LBA, so that the write command includes the logic block address LBA showing a write start address and the number BC of blocks showing a data length. When a notification of the write access is received from the host adapter 26, the cache control unit 28 develops the write data into the data buffer area 32 and notifies the host adapter 26 of the end of writing. In response to this notification, the host adapter 26 notifies the host side of the normal end of the write command. When the write data is stored into the data buffer area 32, the cache control unit 28 registers management information showing a developing position of the write data into the cache management table 30. The write data developed in the data buffer area 32 is written back to the MO medium 36 via the device adapter 34 in accordance with an LRU algorithm of the cache control unit 28. After completion of the medium writing operation, the contents in the corresponding cache management table 30 are cleared. When a read command is received by the host adapter 26 from the host side, the cache control unit 28 receives the notification of the read access and refers to the cache management table 30. If a cache hit occurs, the cache control unit 28 reads out the corresponding data in the data buffer area 32 and transfers to the host. When there is a mis-hit with reference to the cache management table 30, target data is read out from the MO medium 36 through the device adapter 34. Read data is responded to the host side from the host adapter 26 via the data buffer area 32. The function of the host adapter 26 provided for the MO drive 20 is realized by the host interface 122 provided for the control unit 110 in FIGS. 2A and 2B. The function of the device adapter 34 is realized by the optical disk controller 114 provided for the control unit 110 in FIGS. 2A and 2B. The cache control unit 28 is realized by the MPU 112 of the control unit 110 and the control logic 115.

The cache management table 30 is developed in, for example, the S-RAM 117. The data buffer area 32 is assured in the D-RAM 118 provided for the control unit 110.

In addition to the cache control function of the MO drive 20, the storing apparatus of the invention is further equipped with the access kind discriminating unit 38 and buffer construction control unit 40. With respect to the write access from the host, the access kind discriminating unit 38 discriminates whether the write address is based on the random access which is discontinuous to the previous write access or the sequential access in which the write accesses continue. With respect to both of the random access and the sequential access, the access kind discriminating unit 38 discriminates whether they are the ascending order access in which the write address increases or a descending order access in which the write addresses decrease. Therefore, there are the following four access kinds which are discriminated by the access kind discriminating unit 38.

I. Ascending order random access
II. Descending order random access
III. Ascending order sequential access
IV. Descending order sequential access The buffer construction control unit 40 dynamically changes the buffer construction of the data buffer area 32 on the basis of a discrimination result of the access kind discriminating unit 38.

Figure 5A:
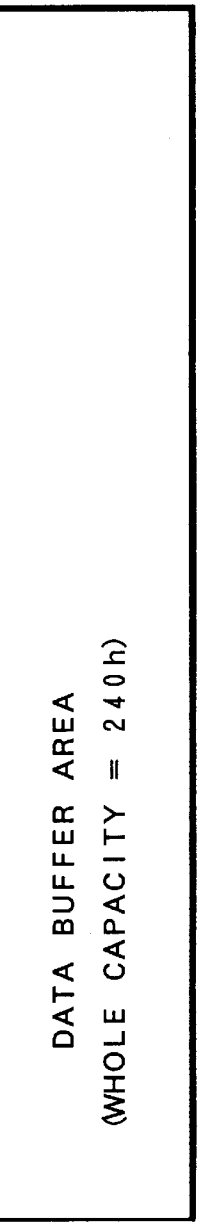
FIGS. 5A to 5C are explanatory diagrams of a data buffer area in FIG. 4.
Figure 5B:
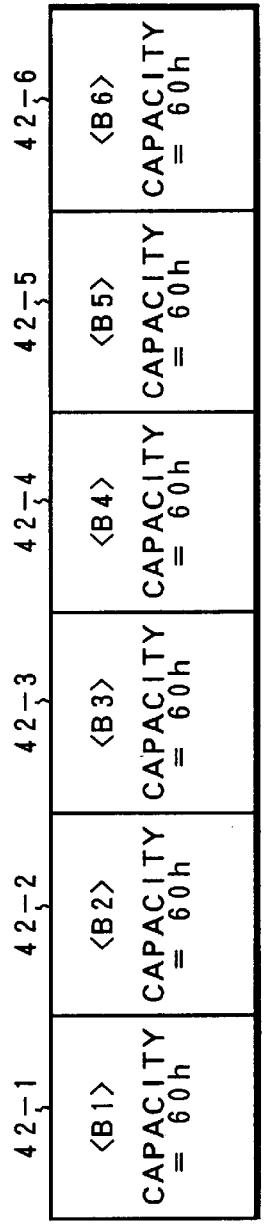

FIG. 5A shows a specific example of the data buffer area 32. An area of, for example, 240h in the hexadecimal notation of a logic block diagram is assured as a full capacity in the D-RAM 118 provided for the control unit 110 in FIGS. 2A and 2B. With respect to the data buffer area 32 in FIG. 5A, the buffer construction control unit 40 dynamically switches a random access corresponding buffer construction of FIG. 5B and a sequential access corresponding buffer construction of FIG. 5C. According to the random access corresponding buffer construction of FIG. 5B, for instance, the data buffer area 32 of the full capacity 240h is divided into six buffer sections 42-1 to 42-6. In this case, each capacity of the buffer sections 42-1 to 42-6 is equal to 60h. Section numbers B1 to B6 are allocated to the six divided random access corresponding buffer sections 42-1 to 42-6 for convenience of explanation. In the sequential access corresponding buffer construction in FIG. 5C, the data buffer area 32 of the full capacity 240h in FIG. 5A is divided into two buffer sections 44-1 and 44-2. In this case, each of the buffer sections 44-1 and 44-2 has a capacity of 120h. When the capacities of the data buffer area 32, each of the random access corresponding buffer sections 42-1 to 42-6, and further, each of the sequential access corresponding buffer sections 44-1 to 44-2 are equal to 576 blocks, 96 blocks, and 288 blocks when they are expressed by the decimal numbers showing the numbers of blocks, respectively. Upon initialization in association with the set-up of the MO drive 20, the buffer construction control unit 40 in FIG. 4 divides the data buffer area into the six buffer sections 42-1 to 42-6 according to, for example, the random access corresponding buffer construction as shown in FIG. 5B. In the state of the random access corresponding buffer construction of FIG. 5B, the sequential access is decided by the access kind discriminating unit 38 with respect to the write access from the host. When the sequential access of a predetermined data amount, for example, the sequential access as much as the full capacity 240h of the data buffer area 32 is determined, the buffer construction control unit 40 changes the buffer construction from the random access corresponding buffer construction of FIG. 5B so far to the sequential access corresponding buffer construction of FIG. 5C. After the buffer construction was changed to the sequential access corresponding buffer construction of FIG. 5C, the random access is decided by the access kind discriminating unit 38. When the number of times of the random access continues a specified number of times, for example, three times, the buffer construction is changed to the random access corresponding buffer construction of FIG. 5B. Such a dynamic change of the buffer construction of the data buffer area 32 corresponding to the host access by the buffer construction control unit 40 is notified to the cache control unit 28 each time. The cache control unit 28 executes the buffer development corresponding to the changed buffer construction of FIG. 5B or 5C and writes the developed write data onto the MO medium 36. The buffer development of the write data by the cache control unit 28 is performed in accordance with the ascending order mode or descending order mode of the write access at that time determined by the access kind discriminating unit 38. When the ascending order mode of the write access is determined and set by the access kind discriminating unit 38, the cache control unit 28 develops the write data in accordance with the ascending order from the head address in the data buffer area 32. On the other hand, when the descending order mode of the write access is determined and set by the access kind discriminating unit 38, the cache control unit 28 develops the write data in accordance with the descending order from the end address in the data buffer area 32. For example, in case of the six divided random access corresponding buffer sections 421 to 42-6 in FIG. 5B, for instance, now assuming that there are empty spaces in all of the sections, the write data is sequentially developed in accordance with the order from the head address in the head buffer section 42-1. On the other hand, in case of the descending order mode, the write data is sequentially developed in accordance with the reverse order from the end address in the last buffer section 42-6. As for the sequential access corresponding buffer sections 44-1 and 44-2 of FIG. 5C as well, in case of the ascending order mode, the write data is sequentially developed in accordance with the ascending order from the head address in the head side buffer section 44-1. In case of the descending order mode, the write data is sequentially developed in accordance with the reverse descending order from the end address in the end side buffer section 44-2.

Figure 6:
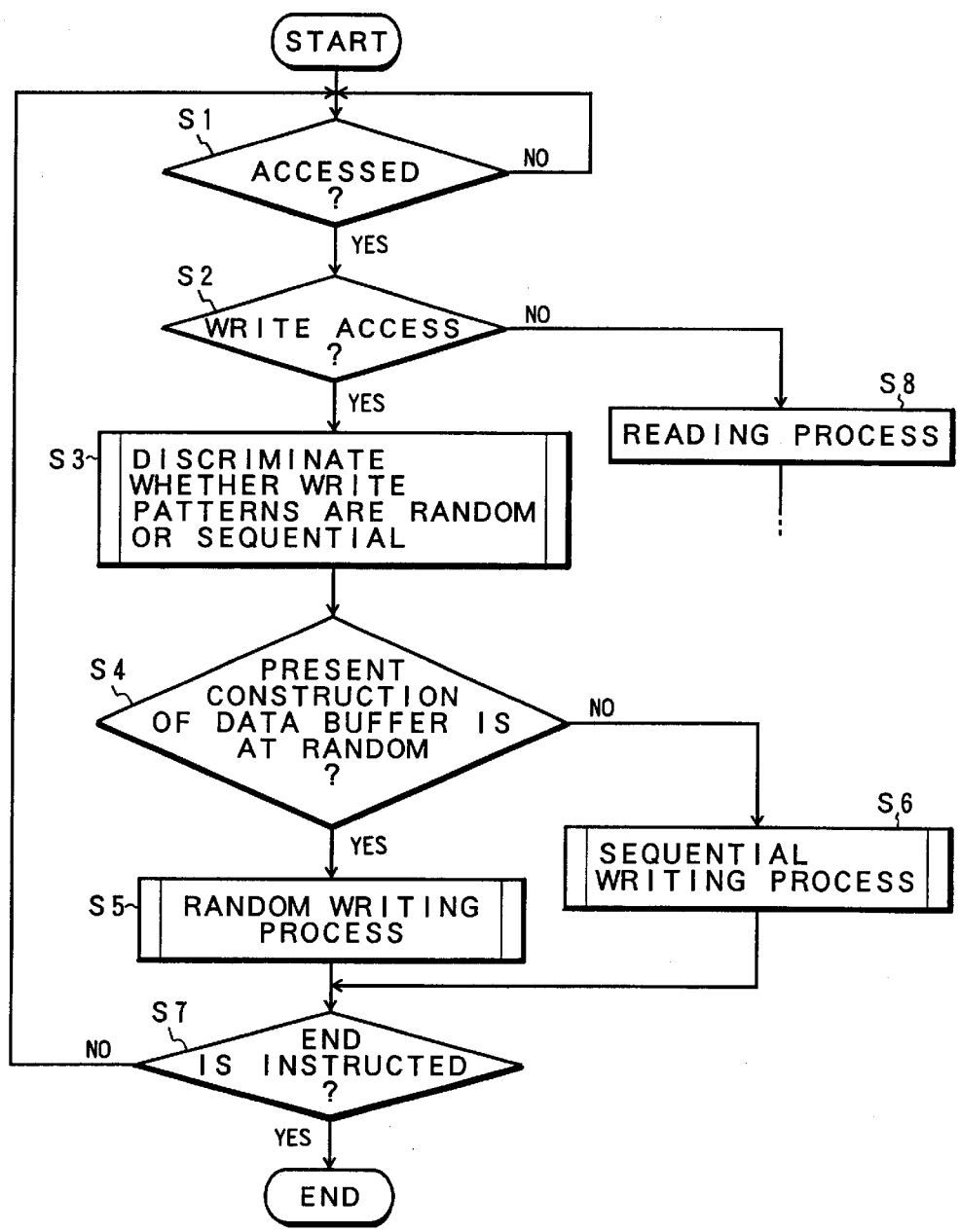
FIG. 6 is a flowchart for a whole control process in response to a write access of a host in FIG. 4.

FIG. 6 is a flowchart for the whole control process in response to the write access in the MO drive 20 in FIG. 4. First in step S1, when an access from the host is received, a check is made in step S2 to see if the access is the write access. If it is the write access, step S3 follows and the access kind discriminating unit 38 discriminates whether the write pattern is random or sequential. In step S4, a check is made to see if the present data buffer construction is the random corresponding construction. If it is the random corresponding construction, a random writing process in step S5 is executed. If NO, since it is the sequential corresponding construction, step S6 follows. A sequential writing process is executed. Such a writing process is repeated until there is an end instruction in step S7. When the access is the read access in step S1, the processing routine advances from step S2 to step S8 and a reading process is executed.

Figure 7:
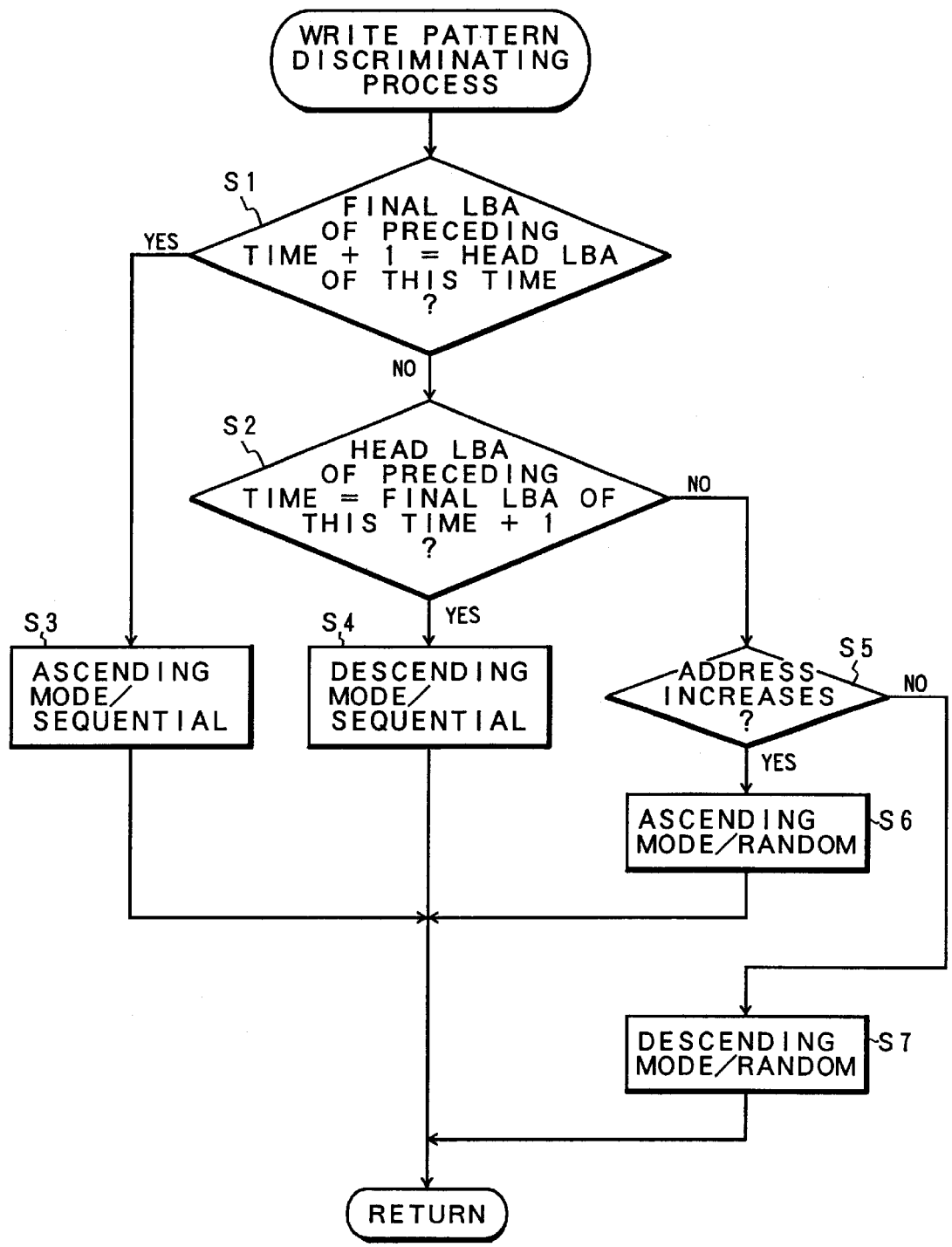
FIG. 7 is a flowchart for a write pattern discriminating process in FIG. 6.

FIG. 7 is a flowchart for a write pattern discriminating process to discriminate whether the write pattern in step S3 in FIG. 6 is random or sequential, namely, for the processing function of the access kind discriminating unit 38 in FIGS. 5A and 5B. First in step S1, a check is made to see if the present head logic block address LBA received as a write address in step S1 is equal to a value obtained by adding "1" to the previous end logic block address LBA in the previous write access. When this address relation is satisfied, step S3 follows and it is determined that the access is the ascending order sequential access. The ascending order mode and the sequential writing mode are set. When the address condition in step S1 is not satisfied, step S2 follows and a check is made to see if the previous head logic block address LBA is equal to a value obtained by adding "1" to the present end logic block address LBA.

When this address relation is satisfied, step S4 follows and it is decided that the access is the descending order sequential access. The descending order mode and the sequential writing mode are set. Further, when the two conditions in steps S1 and S2 are not satisfied, step S5 follows and the presence or absence of an increase in present address from the previous address, namely, an increase of the logic block address LBA is determined. If the address increased, step S6 follows and it is determined that the access is the ascending order random access. The ascending order mode and the random writing mode are set. If the address decreased in step S5, step S7 follows and it is decided that the access is the descending order random access. The descending order mode and the random writing mode are set.
(Random Writing Process)

FIGS. 8A and 8B show the details of the random writing process in step S5 in FIG. 6 in the case where the random writing mode is determined in the write pattern discriminating process in FIG. 7. The random writing process is characterized in that when there is a sequential access that is equal to the data buffer capacity, the buffer construction is changed from the random corresponding construction to the sequential corresponding construction. First in step S1, a check is made to see if the number of write blocks by the present sequential access has reached the data buffer capacity, for example, 240h. If the condition in step S1 is not satisfied, a check is made in step S2 to see if the write access is the sequential access. If it is the sequential access, step S3 follows and the number of blocks instructed by the write access is counted up. If it is not the sequential access, the counter to count the number of blocks is cleared in step S3. The processing routine advances to step S5 and a check is made to see if the write data can be developed in the buffer. That is, if there is no empty area in the random access corresponding buffer sections 42-1 to 42-6 in FIG. 5B and the write data which has already been developed is discontinuous, it cannot be developed in the buffer. Therefore, the write data is written onto the medium of any one of the buffer sections in step S6. The apparatus waits for the end of the writing in step S7 in association with the medium writing. When the medium writing of the buffer section is finished, the write data can be developed into the buffer. When the write data can be developed into the buffer in step S5 or when the buffer development can be performed due to the end of the medium writing in step S7, the processing routine advances to step S8 and a check is made to see if the write access is based on the ascending order mode. If it is the ascending order mode, step S9 follows and the write data is developed into the corresponding buffer section in accordance with the ascending order. The buffer development is accompanied with a data transfer instruction corresponding to the data buffer area, a medium writing instruction from the data buffer, further, a normal end report of the write access to the host, and the like. When the write access is based on the descending order mode in step S8, step S10 follows and the write data is developed into the corresponding buffer section in accordance with the descending order. The buffer development in the descending order is also similarly accompanied with a data transfer instruction to the data buffer area, a writing instruction of the developed data to the MO medium, further, a normal end report of the write access to the host, and the like.

The buffer developments of the write data according to the ascending order mode and the descending order mode in steps S8 to S10 will now be described with reference to FIGS. 9A to 9C. FIG. 9A shows the ascending order development of the write data and relates to the buffer development when the ascending order random access of, for instance, six write commands #1 to #6 continues. In the ascending order development, the write data of the write commands #1 to #6 serving as six ascending order random accesses is developed in accordance with the order from the head buffer section B1 to the buffer section B6. FIG. 9B shows the descending order development of the write data and relates to the case where, for example, the six write commands #1 to #6 of the descending order random accesses in which the write addresses sequentially decrease continue. In the descending order development of the write data, the write data of the write commands #1 to #6 serving as descending order random accesses is developed in accordance with the order from the end position of the buffer section B6 on the end side. Further, FIG. 9C shows an example of the buffer development in which the ascending order mode and the descending order mode mixedly exist. That is, in this example, the write commands #1 and #2 relate to the case of the descending order, the commands #2 and #3 likewise relate to the case of the descending order, the write commands #3 and #4 relate to the case of the ascending order, the commands #4 and #5 relate to the case of the descending order, and further, the write commands #5 and #6 relate to the case of the ascending order, respectively. In the case where the ascending order random access and the descending order random access mixedly exist as mentioned above, if the write access at that time is based on the ascending order in the state of the descending order mode, the mode is changed to the ascending order mode and the ascending order development is performed. On the contrary, if the write access at that time is based on the descending order in the state of the ascending order mode, the mode is changed to the descending order mode and the descending order development is performed. That is, in the invention, the ascending order development and the descending order development as shown in FIG. 9C corresponding to the ascending order in which the addresses of the random accesses increase and the descending order in which the addresses decrease are dynamically executed.

In the D-RAM 118 in FIGS. 2A and 2B to which the data buffer area 32 is allocated, for example, in case of the random access corresponding buffer sections B1 to B6 in FIG. 5B, the data writing operation is performed in accordance with the order from the address of the small buffer section to the address of the large buffer section and the data reading operation for medium writing is also performed in accordance with the order from the small address to the large address. This order corresponds to the buffer ascending order development. As for the buffer descending order development, on the other hand, since the address orders for writing and reading from the small address to the large address in the D-RAM 118 are fixed, in the control logic 115 in FIGS. 2A and 2B, when the descending order mode is set, the logic block addresses in the descending order from the host are converted to the logic block addresses in the ascending order and the write data is written into the D-RAM 118. When the write data is read out from the D-RAM 118 for medium writing, the data read out in accordance with the address order is converted to the data of the original descending order address. The data is further rearranged in accordance with the order of the ascending order addresses and is written onto the medium.

Referring again to FIGS. 8A and 8B, through the processes in steps S1 to S10, when the counter value indicative of the number of blocks of the write access in association with the sequential access in step S7 reaches the data buffer capacity 240h, it is determined in step S1 and the processing routine starts the process for changing the buffer construction from the random corresponding construction to the sequential corresponding construction in steps S1 to S13. In the change of the buffer construction, first in step S1, the write data developed in the state of the six divided buffer sections 42-1 to 42-6 in FIG. 5B is written to the MO medium on a unit basis of each of the buffer sections 42-1 to 42-6. After the end of the medium writing of all of the development data was discriminated in step S12, the buffer construction is changed from the random corresponding construction having the six divided buffer sections 42-1 to 42-6 in FIG. 5B to the sequential corresponding construction of the two divided buffer sections 44-1 and 44-2 in FIG. 5C in step S13. Since the change of the buffer construction in steps S1 to S13 is executed in the next write access after the number of blocks of the sequential access reached 240h, after the buffer construction was changed to the sequential corresponding construction in step S3, a check is made in step S8 to see if the mode is the ascending order mode. If it is the ascending order mode, the write data is developed by the ascending order for the buffer construction after the change as a target in step S9 and, if it is the descending order mode, the write data is developed by the descending order for the buffer construction after the change as a target. In association with the change of the buffer construction in step S13, since the random writing mode is changed to the sequential writing mode, the processing routine advances to the sequential writing process in step S6 in FIG. 7 from the next write access.

(Sequential Access Writing Process)

Figure 5C:
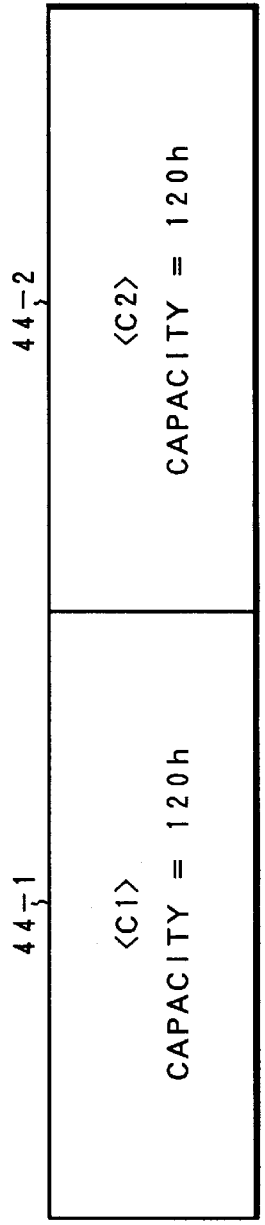
Figure 10A:
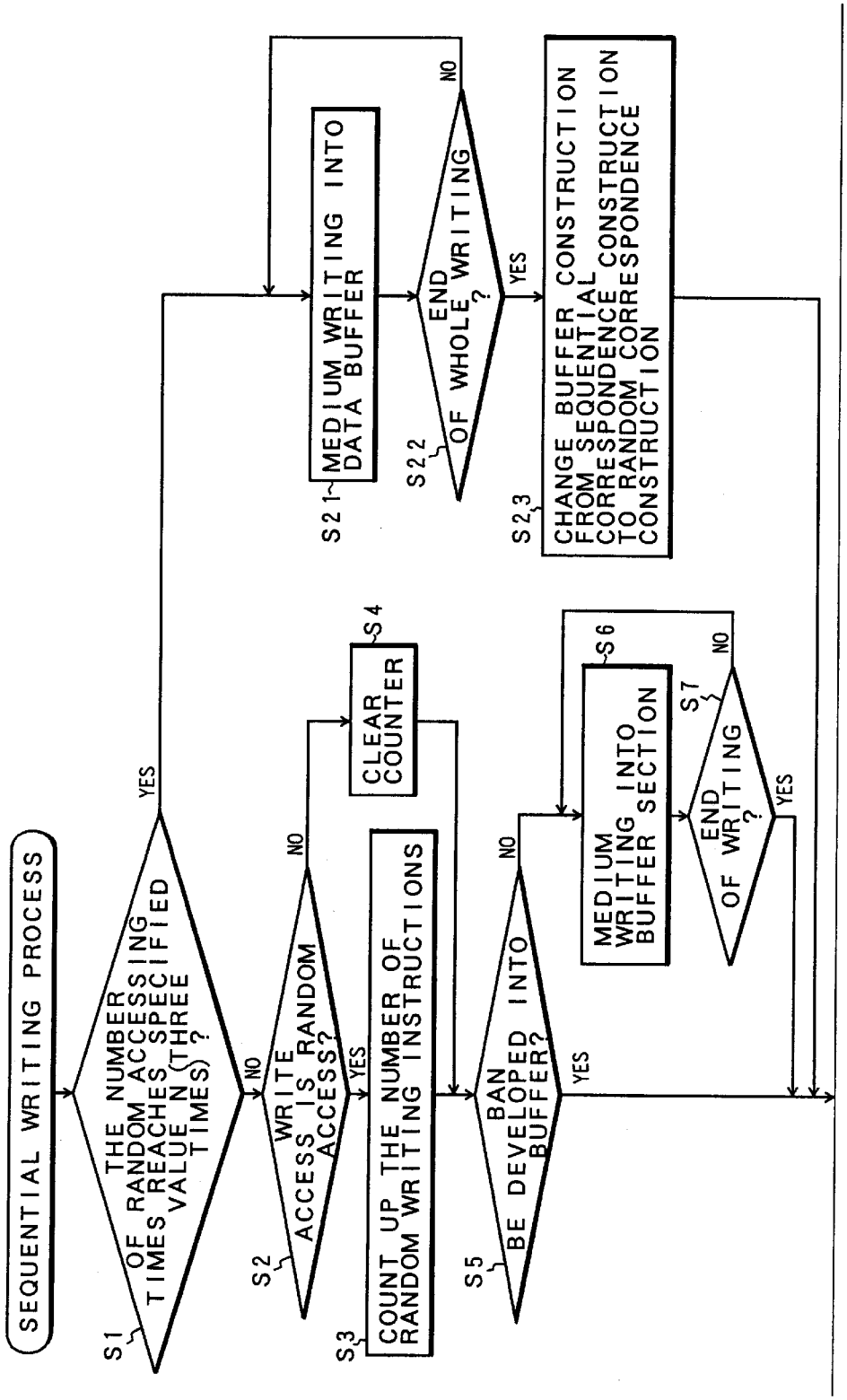
FIGS. 10A and 10B are flowcharts for a sequential writing process in FIG. 6.
Figure 10B:
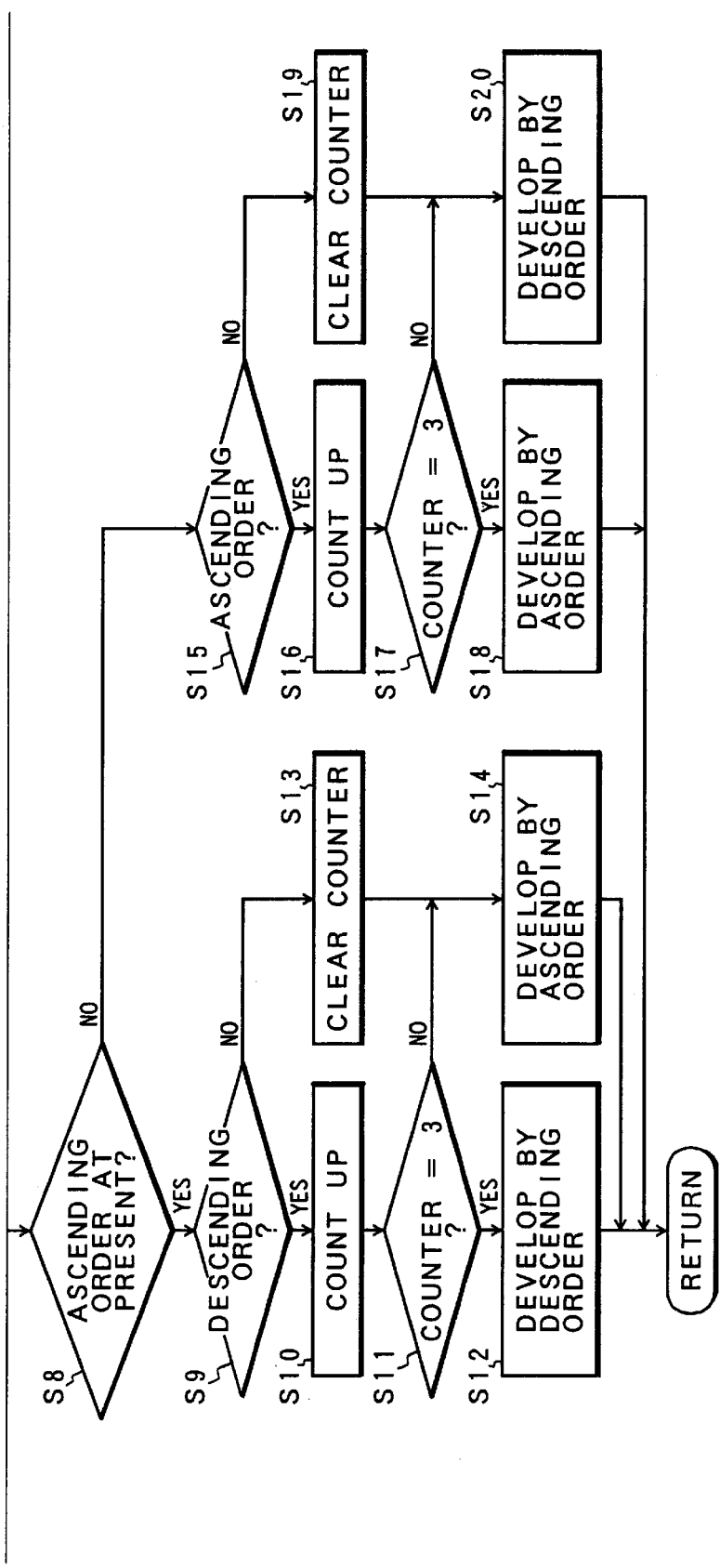

FIGS. 10A and 10B show the details of the sequential writing process which is executed in step S6 in FIG. 6 in the case where the sequential corresponding buffer construction is determined by the write pattern discriminating process in FIG. 7. In the sequential writing process, when the random write accesses from the host continue a specified number of times N, for example, (N=3 times) in the setting state of the sequential writing mode, the buffer construction is changed to the random processing construction and the mode is returned to the random writing mode. In the sequential writing process, first in step S1, a check is made to see if the present number of random accessing times counted by the counter has reached the specified number N, for example, (N=3 times). When the continuous number of times of the random write access is less than 3 times, step S2 follows and a check is made to see if the write access is the random access. In case of the random access, the number of random accessing times is counted up in step S3. If the write access is the sequential access, the counter is cleared in step S4. In step S5, a check is made to see if the write data can be developed into the buffer. In this instance, the data buffer area is divided into the two buffer sections 44-1 and 44-2 as shown in FIG. 5C. For example, while the write data of the sequential access is sequentially being developed into the buffer section 44-1, the developed write data is written back from the remaining buffer section 44-2 to the MO medium. Therefore, if there is an empty area in the buffer section 44-1 that is at present being developed, the write data can be developed. However, if the buffer section 44-1 is filled with data and there is no empty area, unless the apparatus waits for the end of the writing to the buffer section 44-2 which is at present in a state during the medium writing, the write data cannot be developed. Therefore, in the case where the write data cannot be developed in the buffer in step S5, the medium writing of the buffer section is discriminated in step S6. The apparatus waits for the end of writing in step S7. If the write data can be developed into the buffer in step S5 or when the medium writing is finished in step S7, the buffer developments corresponding to the ascending order mode and the descending order mode in the sequential access are executed by the processes in steps S8 to S20. The change from the ascending order mode to the descending order mode in the sequential access is performed when the descending order access continues a specified number of times, for example, three times. This point shall also apply to the case of changing the mode from the descending order mode to the ascending order mode and, when the ascending order access continues three times, the mode is changed to the ascending order mode. The ascending order development and the descending order development of the write data in the buffer construction corresponding to the sequential access will now be described as follows.

FIG. 11A is an explanatory diagram of the ascending order buffer development of the write data in the sequential corresponding buffer construction. This diagram corresponds to the case where the write commands #1 to #12 serving as a sequential access are received from the host and the ascending order access in which the write addresses increase is determined. As for the write commands #1 to #12 of the ascending order sequential access, for example, the write data of the write commands #1 to #12 is sequentially developed in accordance with the order from the head address in the buffer section C1. FIG. 11B shows the descending order development of the write data in the case where the descending order sequential access of the write commands #1 to #12 is received from the host. In this case, the write command #1 of the largest write address is inserted to the end position in the buffer section C2 on the address end side and, subsequently, the write data of the write commands #2 to #12 is developed by the descending order in which the addresses decrease.

Figure 12A:
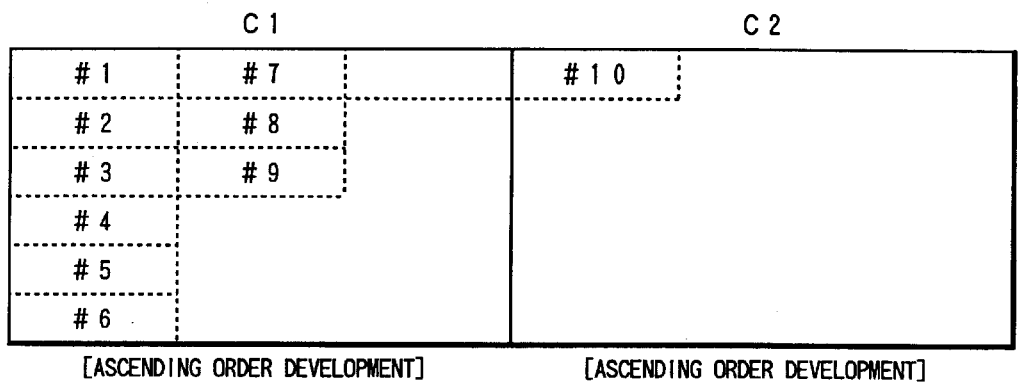
FIGS. 12A to 12C are explanatory diagrams of the switching from the ascending order buffer development and the descending order buffer development in the sequential access in FIGS. 10A and 10B.
Figure 12B:
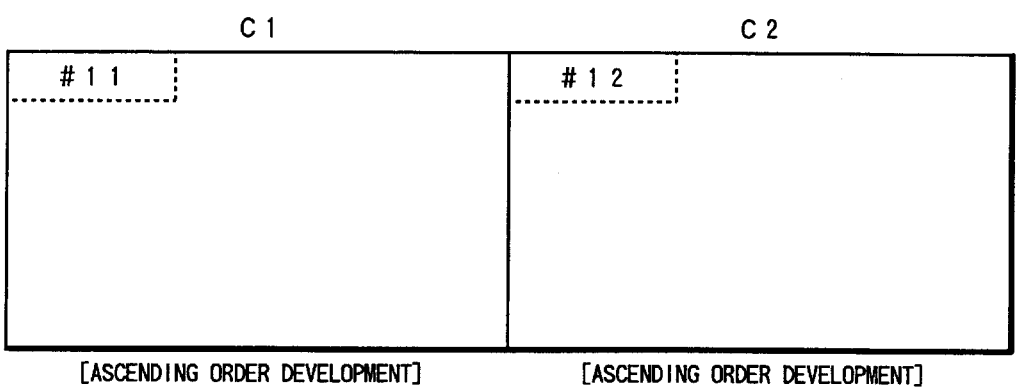
Figure 12C:
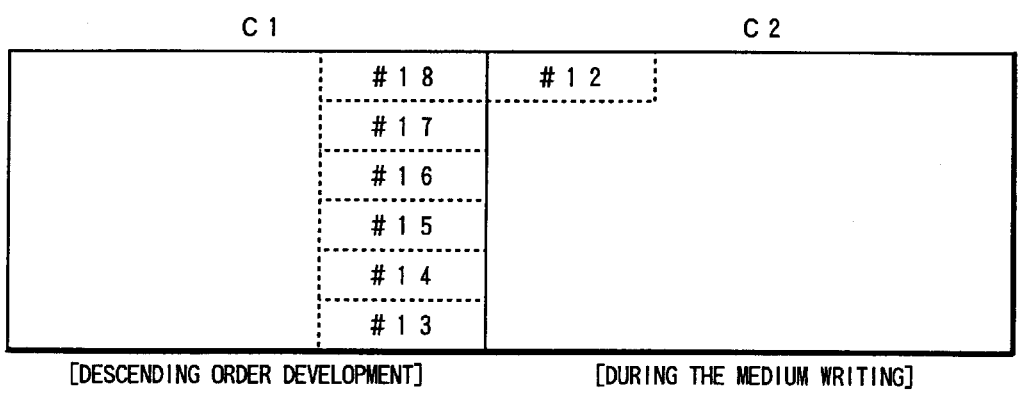

FIGS. 12A to 12C show a case where the ascending order sequential access and the descending order sequential access mixedly exist. For example, it is now assumed that there are the sequential accesses #1 to #9 of the descending order from the host and the sequential accesses #10 to #12 of the descending order are subsequently received. First, as for the sequential accesses #1 to #9 of the ascending order, as shown in the buffer section C1 of FIG. 12A, the write data of the write commands #1 to #9 is sequentially developed in accordance with the order from the head. After completion of the buffer development of the write access #9, the next write access #10 is performed in the descending order for the previous write access #9 and is discontinuous. Therefore, the write data is stored in the head address in the buffer section C2. As for the next write access #11 of the descending order, since the buffer development corresponds to the ascending order mode at this time point, the apparatus waits for the end of the medium writing of the write commands #1 to #9 in the buffer section C1. After that, the write data is developed to the head position in the buffer section C1 as shown in FIG. 12B. Similarly, as for the next write access #12 of the descending order as well, the apparatus waits for the end of the medium writing of the write command #12. After that, the write data is developed to the head position in the buffer section C2. When the number of times of the descending order access reaches three times due to the buffer development of the write commands #10 to #12, the mode is switched from the ascending order mode so far to the descending order mode. When the mode is switched to the descending order mode, as shown in FIG. 12C, as for the next write commands #13 to #18 of the descending order, the apparatus waits for the end of the writing to the MO medium of the write data of the write command #11 which was developed by the ascending order in the buffer section C1 in FIG. 12B. After that, the write data of the write command #13 of the largest write address is developed into the empty end address in the buffer section C1. Subsequently, the write data of the write accesses #14 to #18 of the descending order is developed in accordance with the descending order.

The ascending order development and the descending order development of the write data in the sequential writing mode in FIGS. 11A, 11B, and 12A to 12C will now be described as follows with respect to steps S8 to S20 in FIGS. 10A and 10B. First in step S8, a check is made to see if the mode is at present the ascending order mode. If it is the ascending order mode, step S9 follows and a check is made to see if the present write access is based on the descending order. If it is the descending order, step S10 follows. A counter to switch the buffer development is counted up. In step S1, a check is made to see if the count value has reached three times. If NO, step S14 follows and the ascending order buffer development corresponding to the present ascending order mode is executed. When the count value reaches three times in step S1, step S12 follows and the mode is switched to the descending order mode and the write data is developed into the buffer in accordance with the descending order. In a state where the present ascending order mode is determined in step S8, if the present write access is based on the ascending order in step S9, the counter is cleared in step S13. The ascending order buffer development according to the present ascending order mode is performed in step S14. When the present mode is the descending order mode in step S8, step S15 follows and a check is made to see if the write access of this time is based on the ascending order. If it is the ascending order, step S16 follows and the counter is counted up. If the count value is less than three times in step S17, the descending order buffer development according to the present descending order mode is performed in step S20. When the count value reaches three times in step S17, step S18 follows. The present descending order mode is changed to the ascending order mode and the write data is developed into the buffer by the ascending order. In the setting state of the present descending order mode, if it is determined that the order is the descending order with respect to the write access of this time in step S15, the counter is cleared in step S19. In step S20, the write data is developed into the buffer by the descending order in accordance with the present descending order mode. Subsequently, when the number of times of the random access reaches the specified value (N=3) in step S1, the processing routine advances to the processes in steps S21 to S23. The buffer construction is changed from the present sequential corresponding construction to the random corresponding construction. Prior to changing the buffer construction, first in step S21, the write data developed in the two divided buffer sections 44-1 and 44-2 in FIG. 5C is written to the MO medium on a unit basis of the buffer sections 44-1 and 44-2. When the end of medium writing to all of the buffer areas is determined in step S22, in step S23, the buffer construction is changed from the sequential corresponding construction of FIG. 5C to the random corresponding construction having the six divided buffer sections 42-1 to 42-6 of FIG. 5B and, at the same time, the sequential mode so far is changed to the random mode. The change in buffer construction in steps S21 to S23 is also executed by the next write access after the count value by the count-up of the random access reached three times in step S3. Therefore, after the buffer construction was changed to the random corresponding construction in step S23, the write data by the write access of this time is developed to the head position (in case of the ascending order) or the end position (in case of the descending order) in the buffer section changed to the random corresponding construction by the processes in steps S8 to S20. As for the next write access, since the mode has already been changed to the random writing mode, the random writing process in step S5 in FIG. 6, namely, the random writing process shown in detail in FIGS. 8A and 8B is executed. In the case where the sequential write accesses continue in the random corresponding buffer construction as mentioned above, the buffer construction is changed to the sequential access corresponding buffer construction and the buffer development is performed by the ascending order. Thus, the number of medium writing times of the same capacity can be reduced into ⅓ as compared with that of the random access corresponding buffer construction.

(Change from Ascending Order Sequential to Ascending Order Random)

FIG. 13 shows a specific example of the write commands #1 to #n received by the MO drive 20 in FIG. 4 from the host. As shown on the right side, each of the write commands #1 to #n has "logic block address LBA/the number BC of blocks" as a command parameter. For example, in case of the write command #1, the logic block address LBA is set to 1000h and the number BC of blocks showing a data amount is equal to 10h. In the write commands #1 to #n, the write commands #1 to #11 are based on an ascending order random access 60 and the subsequent write commands #12 to #n are based on an ascending order sequential access 62. The development of the write data into the data buffer area and the medium writing when the write commands #1 to #n in FIG. 13 are received are as shown in FIGS. 14A to 14I. In FIG. 13, with respect to the write commands #1 to #11 of the ascending order random access 60, the buffer construction of the six divided buffer sections 42-1 to 42-6 in FIG. 5B is used. However, when the number of blocks of the write data by the ascending order sequential access 62 from the write command #12 reaches the data buffer capacity 240h, the buffer construction is changed to the sequential access corresponding buffer construction of the two divided buffer sections 44-1 and 44-2 in FIG. 5C.

FIG. 14A shows the buffer development of the write commands #1 to #11 of the ascending order random access 60 in FIG. 13. First, in the head write command #1, the write data is developed to the head position in the head buffer section B1 in accordance with the setting of the ascending order mode. In the remaining write commands #2 to #6, since the addresses are based on the discontinuous random access, the write data is developed to the head positions in the buffer sections B2 to B6 in accordance with the address order. During the development of the write command #2 and subsequent write commands, the write data of the write command #1 developed for the first time is being written to the medium in accordance with the LRU algorithm.

Therefore, with regard to the next write command #7, the write data cannot be developed into the buffer section B1 during the medium writing. However, since the logic block address LBA of the write command #7 continues to 2010h and the logic block address LBA=2000h of the write command #2, the write data is developed subsequently to the development data of the write command #2 in the buffer section B2. With respect to the next write commands #8 to #11 as well, since the logic block address LBA continues to each of the developed write commands #3 to #6, the write data is developed subsequently thereto, respectively.

FIG. 14B shows the buffer development of the head write commands #12 to #17 of the sequential access 62 in FIG. 13. Now, although the ascending order sequential access 62 in FIG. 13 shows the logic addresses LBA of only the write commands #12, #13, #14, and #47 and the number BC of blocks, the other write commands have the logic addresses LBA in each of which the address is increased every 10h. As for the ascending order sequential write accesses #12 to #17 in FIG. 14B, the write data is developed by the ascending order into the buffer section B1 in which the medium writing of the write data of the developed write access #1 has been finished in FIG. 14A. In this instance, the write data of the write commands #2 and #7 in the next buffer section B2 is being written to the medium. After completion of the medium writing in the buffer section B2 in FIG. 14B, as shown in FIG. 14C, the next ascending order sequential write data of the write accesses #18 to #23 is developed into the buffer section B2 in which the medium writing was finished. At this time, the next buffer section B3 is being written to the medium. Similar processes are repeated hereinbelow with respect to the write commands #24 to #35. FIG. 14C shows a state where the write data of the write commands #36 to #41 of the next sequential access is developed into the buffer section B5 and the buffer section B6 is in the medium writing state.

Further, FIG. 14E shows a state where the medium writing to the last buffer section B6 was finished and the write data of the sequential write accesses #42 to #47 has been developed by the ascending order. Due to the development of the write data of the write access #47 in FIG. 14E from the buffer development of the write command #12 in FIG. 14B, the number of development blocks by the sequential access reaches 240h that is equal to the buffer capacity. The changing condition to change the buffer construction from the random access corresponding buffer construction having the present six divided buffer sections B1 to B6 to the sequential access corresponding buffer construction having the two divided buffer sections C1 and C2 is satisfied. Therefore, as shown in FIG. 14F, in a state where the next write command #48 is received and reserved, the medium writing process for writing the buffer sections B1 to B6 in the data buffer area onto the MO medium in accordance with the order is executed. When the medium writing of the buffer section B6 is finished, the buffer construction of the data buffer area is changed to the sequential access corresponding buffer construction having the two divided buffer sections C1 and C2 as shown in FIG. 14G. The write data of the write command #48 which has at present reserved is developed to the head position in the buffer section C1 after the change was finished. As for the write commands #49 to #65 subsequent to the write command #48, the write data is developed by the ascending order subsequently to the write command #48 as shown in FIG. 14H. After that, the write data of the next write commands #66 to #83 is developed into the buffer section C2 by the ascending order. In this instance, the development write data of the write commands #48 to #65 in the buffer section C1 after completion of the development is written to the MO medium. When the medium writing of the buffer section C1 in FIG. 14H is finished, as shown in FIG. 14I, the write data of the write commands #84 to #101 of the next sequential access is developed into the buffer section C1 in which the medium writing was finished. At the same time, the write data of the write commands #66 to #83 developed in the buffer section C2 is written to the MO medium.

As mentioned above, in the case where the sequential write accesses continue in the state of the random corresponding buffer construction, the buffer construction is changed to the sequential access corresponding buffer construction and the write data is developed in the buffer by the ascending order. Thus, the number of development destination onto the buffer is increased three times as large as that in the random access corresponding buffer construction. Since the write data from the host developed in the buffer can be written to the medium in a lump, the number of medium writing times can be reduced.

(Change from Ascending Order Random to Ascending Order Sequential)

FIG. 15 shows a specific example of the write commands #1 to #n received by the MO drive 20 in FIG. 4 from the host. The write commands #1 to #20 locating on the head side are based on an ascending order sequential access 70 and the write commands #21 to #n subsequent thereto are based on an ascending order random access 72. When the write commands #1 to #20 of the ascending order sequential access 70 are received, the buffer construction of the data buffer area is the sequential access corresponding buffer construction having the two divided buffer sections 44-1 and 44-2 in FIG. 5C. Therefore, when the mode enters the ascending order random access 72 and the write command of the random access continues three times, the buffer construction is changed to the random access corresponding buffer construction having the six divided buffer sections 42-1 to 42-6 in FIG. 5B. In response to the write commands in FIG. 15, the buffer development to the data buffer area in FIGS. 16A to 16G and the buffer switching are executed.

Figure 16A:
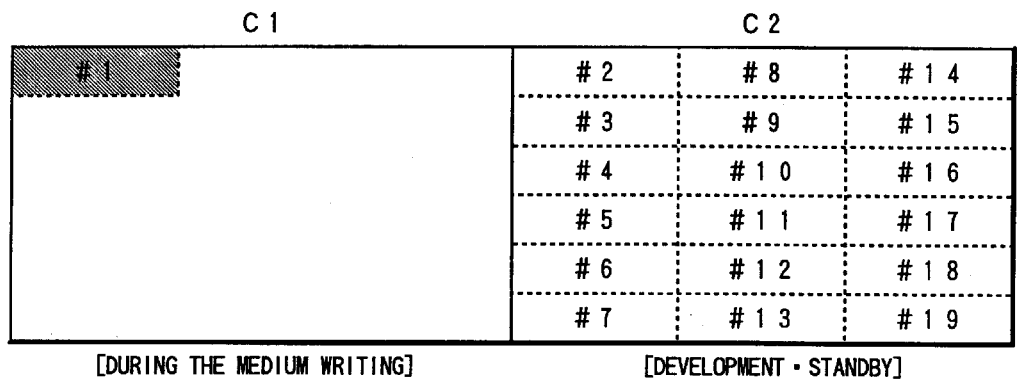
Figure 16B:
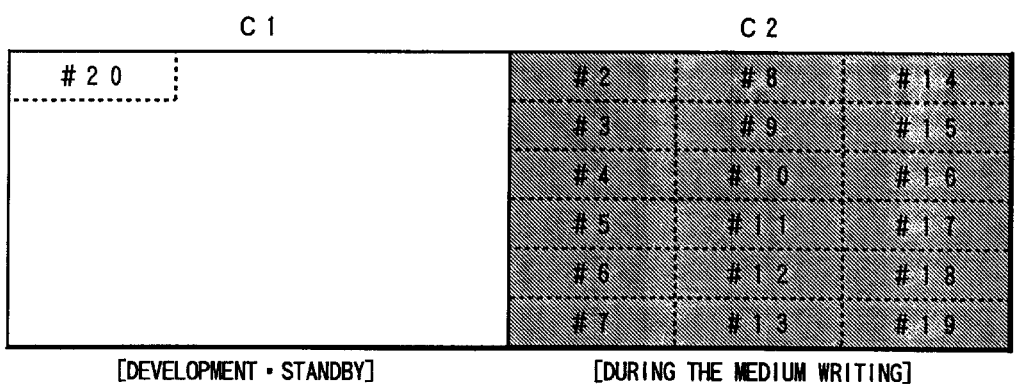
Figure 16C:
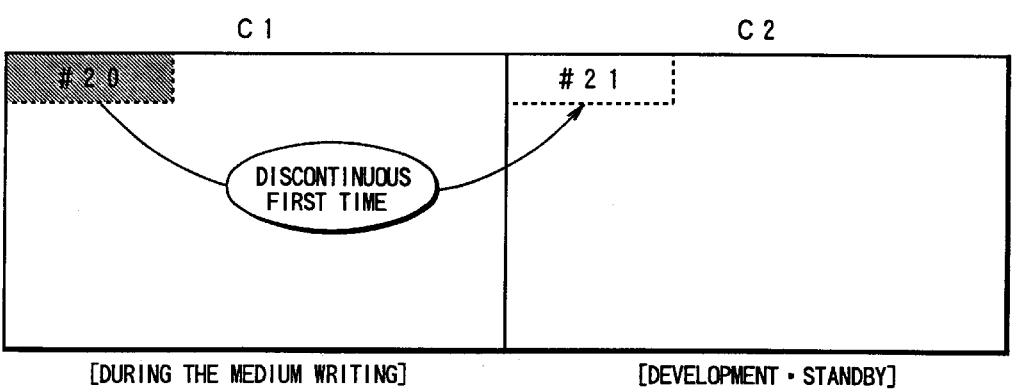

FIG. 16A shows the buffer development of the write commands #1 to #19 of the ascending order sequential access 70 in FIG. 15. In this instance, the buffer construction is the sequential access corresponding buffer construction having the two divided buffer sections C1 and C2 and relates to the ascending order mode. Therefore, the first write command #1 is developed to the head position in the buffer section C1. After completion of the development, the write data is written to the MO medium. In the next write commands #2 to #19, the write data is developed into the buffer section C2 by the ascending order. When the medium writing of the buffer section C1 in FIG. 16A is finished, the write data of the next write command #20 is developed in the buffer section C1. At the same time, the write data of the write commands #2 to #19 in which the development was finished is written back to the MO medium from the buffer section C2. After completion of the medium writing of the buffer section C2 in FIG. 16B, as shown in FIG. 16C, the next write command #21, namely, the write command #21 locating at the head of the ascending order random access 72 in FIG. 15 is developed into the buffer section C2. At the same time, the write data of the write command #20 developed to the buffer section C1 is written back to the MO medium. At this time, as for the write data of the previous write command #20 and the write data of the write command #21 of this time, the logic block address LBA is discontinuous and the random access of the first time is counted. FIG. 16D shows a state where the write data of the write command #22 has been developed by the end of the writing of the buffer section C1 of FIG. 16C. In this instance, the write data of the write command #21 developed to the buffer section C2 is written to the MO medium. In this case, the previous write command #21 and the write command #22 of this time are discontinuous and the second random access is counted. FIG. 16E shows a state where the medium writing of the buffer section C2 is finished and the write data of the next write command #23 has been developed. In this instance, the write data of the write command #22 developed to the buffer section C1 is being written to the MO medium. At this time, the previous write command #22 and the write command #23 of this time are discontinuous and the third random access is counted. After the number of random accessing times reached three times, when the access of the next write command #24 is received and reserved in FIG. 16F, it is determined that the changing condition of the random access corresponding buffer construction has been satisfied. In association with it, each write data of the developed write commands #22 and #23 is written to the MO medium in accordance with the order of the buffer section C1 and C2. When the medium writing of the buffer sections C1 and C2 is finished, as shown in FIG. 16G, the buffer construction is changed to the random access corresponding buffer construction having the six divided buffer sections B1 to B6. The write data of the write command #24 held at the head position in the head buffer section B1 is developed. With respect to the random access of the next write commands #25 to #35, since the buffer section B1 is in the medium writing state, the write data is developed into the buffer sections B2 to B6 in the standby mode as shown in the diagram. As mentioned above, in the case where the random ascending order write accesses continue in the state of the sequential corresponding buffer construction, the buffer construction is changed to the random access corresponding buffer construction and the write data is developed to the buffer by the ascending order. Thus, the number of development destinations onto the buffer is increased three times as large as that in the sequential access corresponding buffer construction. The write data from the host developed onto the buffer can be written to the medium in a lump, so that the number of medium writing times can be reduced.

(Change from Ascending Order Random to Descending Order Sequential)

FIG. 17 shows a case where the MO drive 20 in FIG. 4 receives the write commands #1 to #n from the host side. Among them, the head write commands #1 to #11 are based on an ascending order random access 80 and the write commands #12 to #n subsequent thereto are based on a descending order sequential access 82. When the write command #1 is received, the data buffer area 32 has the random access corresponding buffer construction of the six divided buffer sections 42-1 to 42-6 in FIG. 5B. Therefore, when the number of blocks showing a data amount of the sequential access reaches the buffer capacity 240h by the descending order sequential access 82 from the write command #12, the buffer construction is changed to the sequential access corresponding buffer construction of the two divided buffer sections 44-1 and 44-2 in FIG. 5C. As for the write commands #1 to #n in FIG. 17, although the access is the same as the ascending order random access 60 in FIGS. 14A to 14I with regard to the write commands #1 to #11 as a head ascending order random access 80, there is a different point that the access of the command #12 and subsequent commands is the descending order sequential access 82.

FIG. 18A shows the buffer development of the write commands #1 to #11 of the ascending order random access 80 in FIG. 17. In a manner similar to the case of FIG. 14A, after the write command #1 was developed to the buffer section B1 by the ascending order, the write data is written back to the MO medium. Subsequently, the write data of the write commands #2 to #11 is developed into the buffer sections B2 to B6 excluding the buffer section B1 in the medium writing state and the apparatus is set into a standby mode. FIG. 18B shows the case where the first write command #12 of the descending order sequential access 82 is received subsequently to the write command #11. After waiting for the end of the medium writing of the buffer section B1 in FIG. 18A, the write data of the write command #12 is developed. At this time, the next buffer section B2 is written to the MO medium. As for the next write command #13, after waiting for the end of the medium writing of the buffer section B2, the write data is developed as shown in FIG. 18C. In this instance, the next buffer section B3 enters the medium writing state. At this time, since the logic block address LBA=9000h of the previous write command #12 for the logic block address LBA=8FF0h of the write command #13, it is decided that the order is the descending order. However, since the mode is the ascending order mode with regard to the buffer development, even with respect to the write command #13 determined to be based on the ascending order access, it is developed to the head side in the buffer section B2 in accordance with the ascending order mode at that time. Subsequently, as for the write commands #14 to #47, similar buffer development and writing of the MO medium are executed as shown in FIGS. 18D and 18E. By the buffer development of the descending order sequential write commands #12 to #47, the number of descending order sequential blocks reaches 240h that is equal to the buffer capacity. The changing condition to the sequential access corresponding buffer construction of the two divided buffer sections 44-1 and 44-2 in FIG. 5C is satisfied. Subsequently, in a state where the write command #48 is received and reserved, it is determined that the number of blocks of the sequential access has reached 240h. The write data is written back to the MO medium in accordance with the order with respect to the buffer sections B1 to B6 as shown in FIG. 18F. After waiting for the end of the medium writing of all of the buffer sections, the buffer construction is changed to the sequential access corresponding buffer construction having the two divided buffer sections C1 and C2 as shown in FIG. 18G. At the same time, the setting of the mode is changed from the ascending order mode so far to the descending order mode. Therefore, the write data of the write command #48 in the standby mode is developed to the end position in the buffer section C2 on the end side by the descending order in association with the change to the descending order mode. The next write commands #49 to #65 are developed into the buffer section C2 by the descending order as shown in FIG. 18H. The next write commands #66 to #83 are likewise developed into the buffer section C1 by the descending order. In this instance, the buffer section C2 enters the medium writing state. When the medium writing of the buffer section C2 is finished, the write data of the next write commands #84 to #101 is developed by the descending order as shown in FIG. 16I. At this time, the buffer section C1 is in the medium writing state. As mentioned above, in the case where the sequential write accesses continue in the state of the random access corresponding buffer construction, the buffer construction is changed to the sequential access corresponding buffer construction and the write data is developed to the buffer in accordance with the descending order. Thus, the number of medium writing times of the same data capacity can be reduced into ⅓ as compared with that of the random access corresponding buffer construction.

(Change from Ascending Order Sequential to Descending Order Random)

FIGS. 19A and 19B show the write commands #1 to #n received by the MO drive 20 in FIG. 4 by the write access from the host. In the write access, the write commands #1 to #20 are based on an ascending order sequential access 90 and the write commands #21 to #n subsequent thereto are based on a descending order random access 92. In the state before the first write command #1 of the ascending order sequential access 90 is received, the data buffer area is set to the sequential access corresponding buffer construction having the two divided buffer sections 44-1 and 44-2 in FIG. 5C. Therefore, when the random access continues three times from the write command #21 to the write command #23 serving as start commands of the ascending order random access 92, the buffer construction is changed to the random access corresponding buffer construction having the six divided buffer sections 42-1 to 42-6 in FIG. 5B. As for the write commands #1 to #20 of the ascending order sequential access 90, the addresses increase from the logic block address LBA=1000h to the logic block address LBA=1130h on a unit basis of the number BC of blocks (=10h). On the contrary, in the descending order random access 92, to make an explanation of the buffer development easy, the addresses of the three write commands #21 to #23 which are necessary for the first change in buffer construction are based on the descending order cycle. The six write commands #24 to #29 corresponding to the development to the first six buffer sections after the buffer construction was changed to the random access corresponding buffer construction are based on one descending order cycle. After that, since one of the six buffer sections enters a medium writing state, the number of buffer sections in which the buffer development can be performed is equal to 5. In correspondence. to it, the every five write commands #30 to #34, #35 to #39, #40 to #44, #45 to #49, . . . of the descending order cycles are repeated.

Figure 20D:
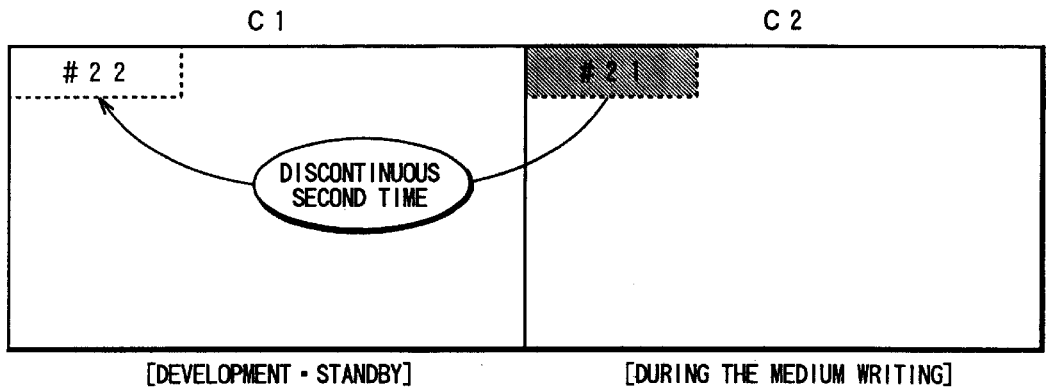
FIGS. 20A to 20V are explanatory diagrams of a buffer development, a standby, and a medium writing of the write commands #1 to #93 in FIGS. 19A and 19B.
Figure 20E:
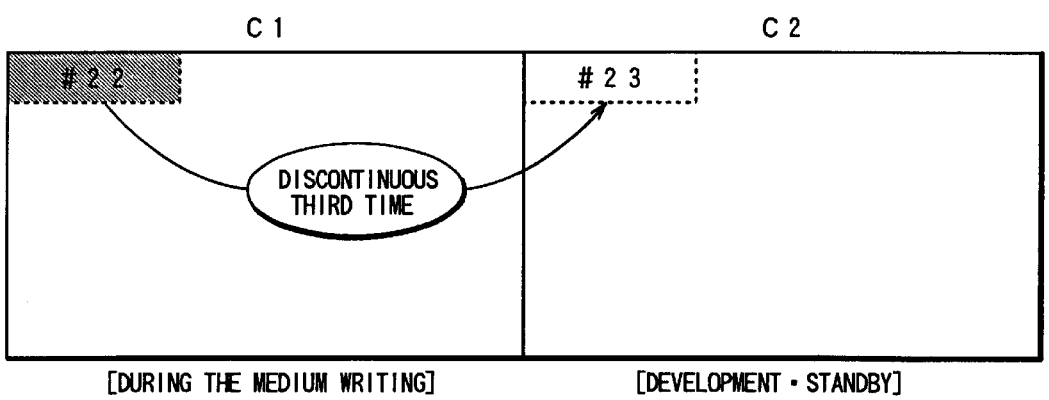
Figure 20F:
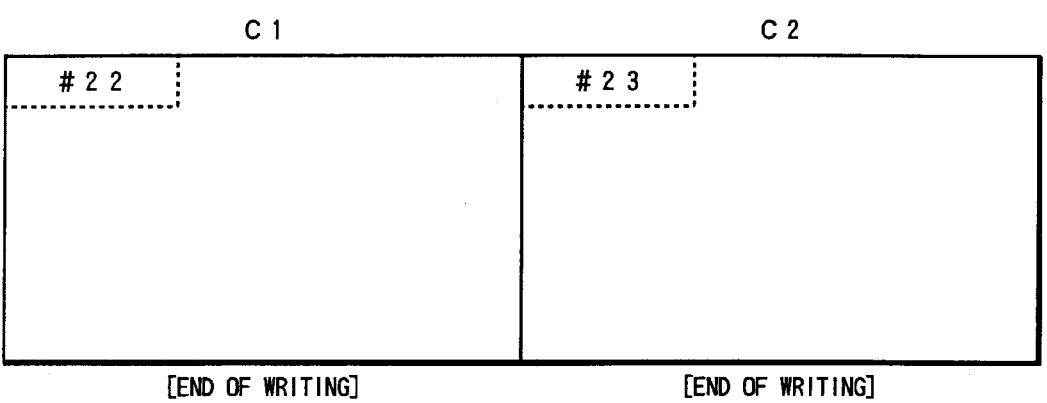
Figure 20G:
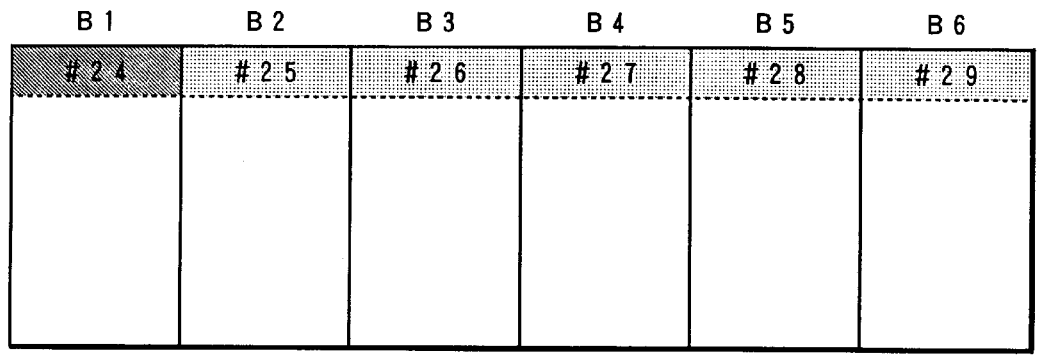
Figure 20H:
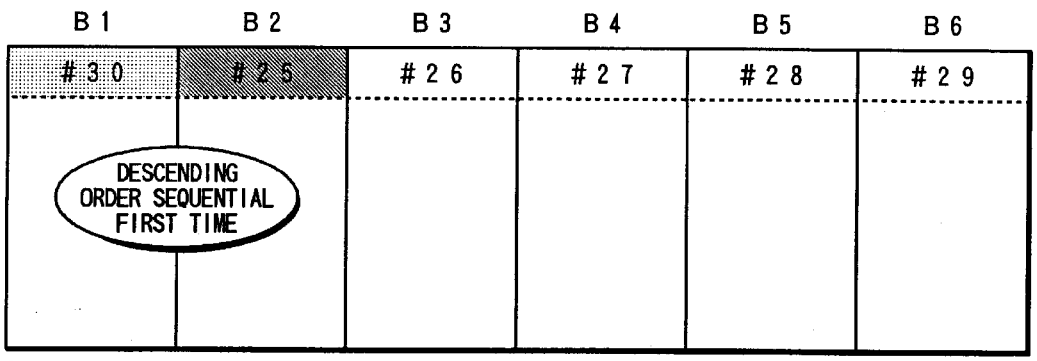
Figure 20I:
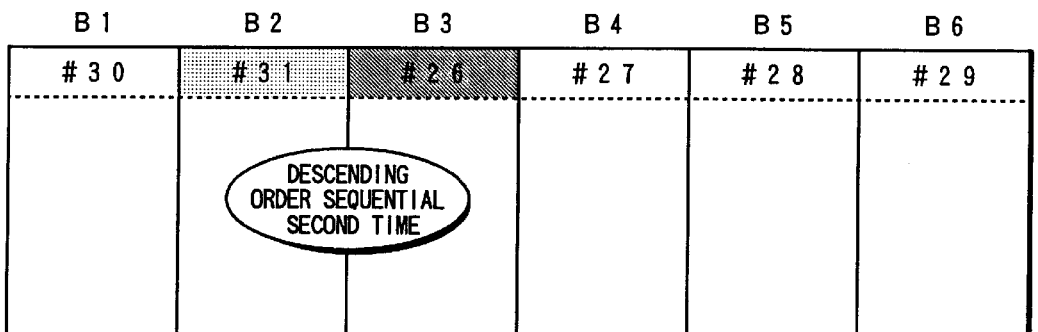
Figure 20J:
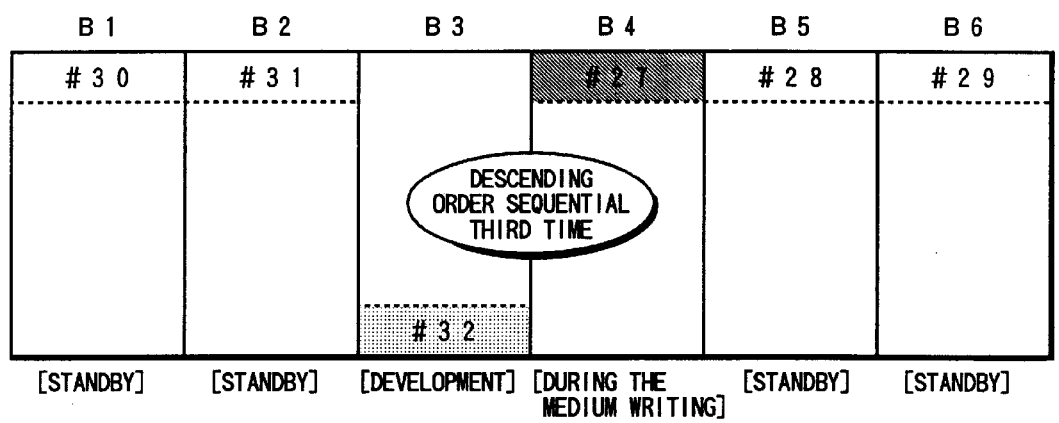
Figure 20K:
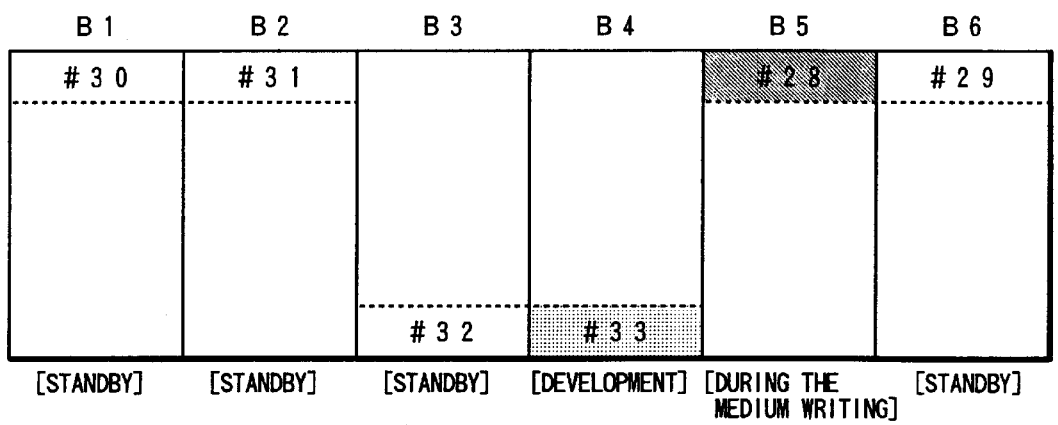
Figure 20L:
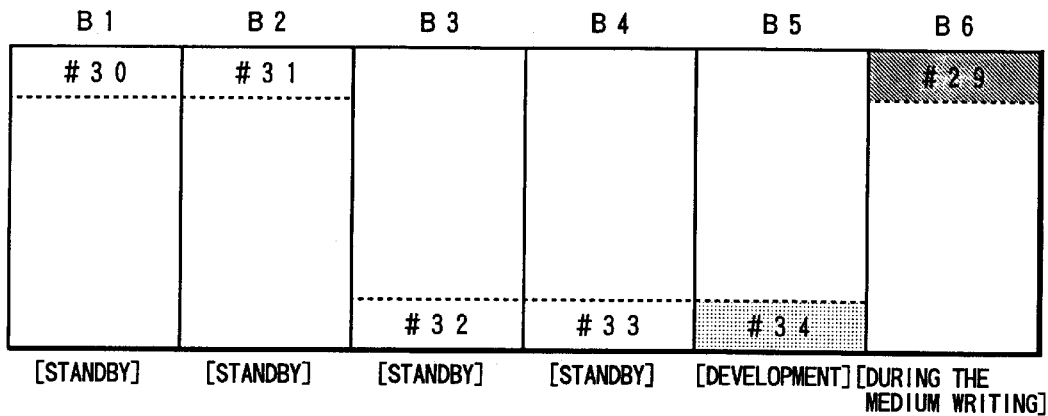
Figure 20M:
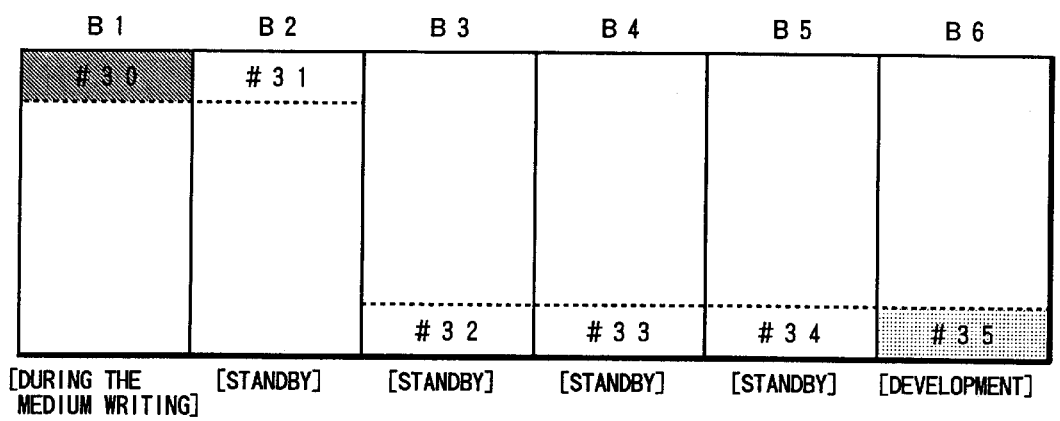
Figure 20N:
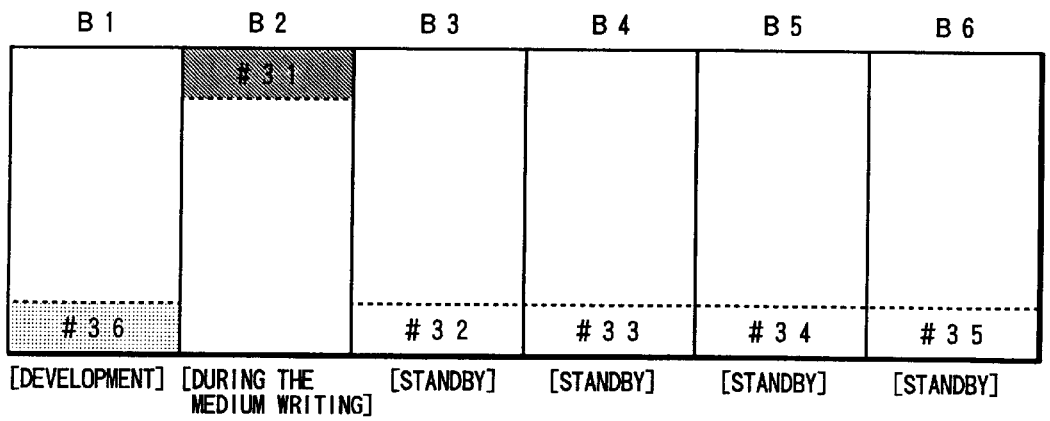

FIG. 20A shows the buffer development of the write commands #1 to #19 in the sequential access 90 in FIG. 19A. First, when the write command #1 is received, since the sequential writing mode and the ascending order mode have been set, the write data of the write command #1 is developed to the head position in the buffer section C1 on the head side in accordance with the ascending order mode. A normal end is notified to the host. When the buffer development of the write data of the write command #1 is finished, the writing to the MO medium of the write data of the developed write command #1 is started. When the write command #1 is subsequently received, since the buffer section C1 is in the medium writing state, the write data cannot be developed. The write data of the write command #2 is developed to the head position in the buffer section C2. In a manner similar to the above, the write data of the write commands #3 to #19 is developed into the buffer section C2 by the ascending order. When the write command #20 is subsequently received, the apparatus waits for the end of the medium writing of the buffer section C1 and the write data of the write command #20 is developed as shown in FIG. 20B. At this time, the buffer section C2 side performs the writing to the MO medium. Subsequently, when the first write command #21 of the descending order random access 92 is received, the apparatus waits for the end of the medium writing of the buffer section C2. As shown in FIG. 20C, the write data of the write command #21 is developed to the head position in the buffer section C2 in accordance with the set ascending order mode at this time. In this instance, the write data of the write command #20 which has already been developed in the buffer section C1 is being written to the MO medium. The logic block address LBA of the write command #21 developed in the buffer section C2 is A000h and corresponds to the discontinuous random access for 1130h as a logic block address LBA of the previous write command #20. The random access of the first time is counted. When the write command #22 is now received, as shown in FIG. 20D, the apparatus waits for the end of the medium writing of the buffer section C1 and the write data of the write command #22 in the standby mode is developed. At this time, the buffer section C2 is being written to the MO medium. For the previous write command #21 of the write command #22, the addresses are arranged in the descending order and are based on the random access. The random access of the second time is counted. When the write command #23 is subsequently received, the apparatus waits for the end of the medium writing of the buffer section C2 and the write data of the write command #23 is developed as shown in FIG. 20E. At this time, the buffer section C1 is being written to the medium. For the previous write command #22 of the write command #23, the addresses are arranged in the ascending order and are based on the random access. The random access of the third time is counted. Thus, the changing condition to the random access corresponding buffer construction in FIG. 5B is satisfied. When the write command #24 is subsequently received, it is recognized that the changing condition to the random access corresponding buffer construction is satisfied because the random access continues three times in the state where the write command #24 is reserved. The buffer sections C1 and C2 are sequentially written as shown in FIG. 20F. When the medium writing is finished in FIG. 20F, the buffer construction is changed to the random access corresponding buffer construction having the six buffer sections B1 to B6 as shown in FIG. 20G. Even if the buffer construction is changed to the random access corresponding buffer construction as mentioned above, the mode is still the ascending order mode at this time point. Therefore, it is regarded that the write commands #24 to #29 are based on the random access. The respective write data is developed to the head positions in the buffer sections B1 to B6 in accordance with the ascending order. The write data of the write command #24 of the buffer section B1 which was first developed is being written to the MO medium. When the write command #30 is subsequently received, the apparatus waits for the end of the medium writing of the buffer section B1 and the write data is developed to the head position in the buffer section B1 by the ascending order as shown in FIG. 20H. At this time, the buffer section B2 enters the medium writing state. The logic block address LBA of the write command #30 of the buffer section B1 is equal to 6FF0h and corresponds to the descending order sequential having addresses of the number which is smaller by only the number BC of blocks (=10h) than 7000h of the logic block address LBA of the write command #25 developed in the next buffer section B2, so that the descending order sequential of the first time is counted. When the write command #31 is now received, the apparatus waits for the end of the medium writing of the buffer section B2 and the write data of the write command #31 is developed as shown in FIG. 20I. At this time, the buffer section B3 enters the medium writing state. The logic block address LBA of the write command #31 developed in the buffer section B2 is equal to 5FF0h, the logic block address LBA of the write command #26 of the next buffer section B3 is equal to 6000h, and they are descending order sequential. Therefore, the descending order sequential of the second time is detected at this time point. When the write command #32 is subsequently received and reserved, the apparatus waits for the end of the medium writing of the buffer section B3 and tries to develop the write data of the write command #32 into the buffer section B3 as shown in FIG. 20J. Prior to development, now checking the logic block addresses LBA of the write command #32 to be tried to develop to the buffer section B3 and the write command #27 which has already been developed to the next buffer section B4, the LBA is equal to 4FF0h for the write command #32 and the LBA is equal to 5000h for the write command #27 and they are based on the descending order sequential. Thus, the descending order sequential of the third time is counted at this time point and the mode is switched from the ascending order mode so far to the descending order mode. By the switching to the descending order mode, the write command #32 in the reserving state is developed to the end position in the buffer section B3 by the descending order. Therefore, with respect to the write command #32 and subsequent commands, the write data is developed to the buffer sections in accordance with the descending order. FIG. 32K shows the descending order development of the next write command #33. Further, with respect to the write commands #34 to #36, they are sequentially developed into the buffer sections B5, B6, and B1 as shown in FIGS. 20L, 20M, and 20N in accordance with the descending order. Further, FIG. 20O shows the descending order development to the buffer section B2 of the write command #37. At this time point, the write data is developed to all of the buffer sections B1 to B6 by the descending order. In this instance, the buffer section B3 is being written to the MO medium. As for the write commands #38 to #62 which are obtained during the medium writing of the buffer section B3, the descending order development for the developed write commands #33 to #37 is continuously performed as shown in FIG. 340 to the buffer sections B1, B2, B4, B5, and B6 excluding the buffer section B3 which is being written to the medium as shown in FIG. 20P.

Thus, for example, when seeing the addresses of the write commands #36, #41, #46, #51, #56, #61 developed in the buffer section B1 by the descending order, they are equal to 5FE0h, 5FD0h, 5FC0h, 5FB0h, 5FA0h, and 5F90h and are descending order sequentially developed. This point shall also similarly apply to the other buffer sections B2 and B4 to B6. Therefore, as shown in FIG. 20Q, subsequently, the next write command #63 is developed to the end in the buffer section B3 by the end of the medium writing of the buffer section B3 and, at the same time, the descending order sequential continuous data of the write commands #33, #38, #43, #48, #53, and #58 of the buffer section B4 is read out from the head position side and is continuously written to the MO medium.

By repeating the above processes up to the buffer sections B5, B6, B1, and B2 in association with the write commands #64 to #68 as shown in FIGS. 20R, 20S, 20T, and 20U, by the end of the medium writing of the buffer section B2, the write data of the next write commands #63 to #68 is developed at the end positions of the buffer sections B3 to B6, B1, and B2 so as to be circulated in a manner such that the buffer section B3 is set to the head section. Therefore, in a manner similar to FIG. 20P, the write data of the write commands #69 to #93 is developed by the descending order into the buffer sections B4 to B6, B1, and B2 excluding the buffer section B3 which is being written to the medium in FIG. 20V. The above processes are repeated hereinbelow. In this manner, when the random write accesses in the descending order continue in the state of the sequential corresponding buffer construction, the number of buffer sections before the development on the buffer is increased three times as many as that of the sequential access corresponding buffer construction. Moreover, by performing the developing operation in the descending order, the write accesses from the host can be written to the medium in a lump, so that the number of medium writing times can be reduced.

In FIGS. 13 to 20V, the following changes have been explained as examples.

I. Change from ascending order sequential to ascending order random

II. Change from ascending order random to ascending order sequential

III. Change from ascending order random to descending order sequential

VI. Change from ascending order sequential to descending order random However, with respect to the following other changes, V. Change from descending order sequential to descending order random VI. Change from descending order random to descending order sequential VII. Change from descending order random to ascending order sequential VIII. Change from descending order sequential to ascending order random in the flowcharts for the random writing process in FIGS. 8A and 8B and the flowcharts for the sequential writing process in FIGS. 10A and 10B, the buffer development destination of the write access from the host is efficiently assured by the selection of the buffer construction based on the discrimination result of the random writing mode and the sequential writing mode and by the buffer developing operation based on the discrimination result of the ascending order mode and the descending order mode. The efficient medium writing such that the write data developed to the buffer is written to the medium as continuous data on a buffer section unit basis can be realized. In the above embodiment, as a changing condition from the random access corresponding buffer construction to the sequential access corresponding buffer construction, the case where the number of blocks of the sequential access reaches the full capacity of the data buffer area has been described as an example. However, it is possible to use a proper data amount in which the continuation of the sequential access can be predicted.

On the contrary, the change from the sequential access corresponding buffer construction to the random access corresponding buffer construction is performed at a timing when the random access continues three times. However, as the number of continuation times of the random access, it is also possible to set the optimum number of switching times by using statistic results or the like.

As another embodiment of the invention, as a buffer construction control unit 40 in FIG. 4, it is also possible to construct in a manner such that the random access corresponding buffer construction of the six divided buffer sections of FIG. 5B or the sequential access corresponding buffer construction of the two divided buffer sections of FIG. 5C is fixedly set by the setup process of the MO drive 20, whether the write access is in the ascending order mode or the descending order mode is discriminated by the access kind discriminating unit 38, and in accordance with a discrimination result, only the buffer development control by the cache control unit 28 is executed to discriminate whether the buffer development to the data buffer area is set to the ascending order buffer development or the descending order buffer development. Thus, even if the buffer construction has been fixedly set in the random access correspondence or sequential access correspondence, the optimum buffer development corresponding to the ascending order and descending order of the write accesses can be performed. The developed write data can be continuously written to the medium in a lump. As compared with the conventional case where the write data is developed into the buffer in the ascending order by regarding that the access is only the ascending order access, the efficiency of the buffer development and the medium writing can be further improved.

According to the invention as mentioned above, with respect to the write access which the upper apparatus tries to write to the storing apparatus, whether it is the sequential access or the random access is discriminated and the buffer construction is dynamically changed to the buffer construction adapted to each access. Thus, the efficient buffer development of the write data corresponding to the form of the write access at that time and the medium writing of the developed write data can be performed. By reducing the total number of medium writing times from the data buffer, the performance of the write access can be fairly improved.

In addition to the dynamic change of the buffer construction corresponding to the sequential access and the random access, whether each access is the ascending order access in which the addresses increase or the descending order access in which the addresses decrease is discriminated. The buffer development of the write data is set to the ascending order development in case of the ascending order access and to the descending order development in case of the descending order access. Thus, the number of buffer sections which can be developed and are assured can be increased as compared with the case of only the ascending order development. By developing the write data of the continuous addresses into the buffer section, the number of times of writing to the medium can be reduced.

In the random writing process in FIGS. 8A and 8B and the sequential writing process in FIGS. 10A and 10B, the buffer development is dynamically changed in accordance with the write access and the ascending order mode and the descending order mode. However, when the storing apparatus is set up, either one of the ascending order buffer development and the descending order buffer development can be also fixedly set.

Although the above embodiment has been shown and described with respect to the case of using the magnetooptic disk as a storing medium as an example, the invention also incorporates all of writable optical storing media such as phase change optical disk, DVD, and the like in which a plurality of rotations of a disk are needed to write to the tracks.

The present invention is not limited by the numerical values shown in the foregoing embodiment. Further, the invention incorporates all of modifications within the scope without losing the objects and advantages of the invention.

What is claimed is:

1. A storing apparatus comprising:

a cache control unit for, when a write access is received from an upper apparatus, caching write data into a data buffer area in a memory, notifying said upper apparatus of a normal end, and thereafter, writing the write data cached in said data buffer area onto a storing medium;

an access kind discriminating unit for discriminating whether the write access from said upper apparatus is a random access in which write addresses are discontinuous or a sequential access in which the write addresses are continuous; and a buffer construction control unit for setting a random corresponding buffer construction which enables a buffer development and a medium writing that are suitable for said random access or a sequential corresponding buffer construction which enables a buffer development and a medium writing that are suitable for said sequential access, for changing the buffer construction to said sequential corresponding buffer construction when said sequential access is decided in a setting state of said random corresponding buffer construction, and for changing the buffer construction to said random corresponding buffer construction when said random access is decided in a setting state of said sequential corresponding buffer construction;

wherein said access kind discriminating unit further sets an ascending order mode for an ascending order access in which a present address is increased from a previous address and sets a descending order mode for a descending order access in which the present address is decreased from the previous address, and said cache control unit caches the write data from a head position in a buffer section by an ascending order in said ascending order mode and caches the write data from an end position in the buffer section by a descending order in said descending order mode.

2. An apparatus according to claim 1, wherein in the setting state of said random corresponding buffer construction, when the number of writing times by said sequential access reaches a predetermined value, said buffer construction control unit changes the buffer construction of said data buffer area from said random corresponding buffer construction to said sequential corresponding buffer construction.

3. An apparatus according to claim 1, wherein in the setting state of said random corresponding buffer construction, when a write data amount by said sequential access reaches a predetermined capacity, said buffer construction control unit changes the buffer construction of said data buffer area from said random corresponding buffer construction to said sequential corresponding buffer construction.

4. An apparatus according to claim 1, wherein in the setting state of said sequential corresponding buffer construction, when the number of times of said random access reaches a specified number of times, said buffer construction control unit changes the buffer construction of said data buffer area from said sequential corresponding buffer construction to said random corresponding buffer construction.

5. An apparatus according to claim 1, wherein when a value obtained by adding "1" to an end address of the previous write access coincides with a head address of the present write access, said access kind discriminating unit determines that the access is an ascending order sequential access.

6. An apparatus according to claim 1, wherein when a head address of the previous write access coincides with a value obtained by adding "1" to an end address of the present write access, said access kind discriminating unit determines that the access is a descending order sequential access.

7. An apparatus according to claim 1, wherein when it is determined that the current mode is the ascending order mode and the write access is a descending order random access, said access kind discriminating unit changes the mode to the descending order mode and caches the write data into the buffer section by the descending order.

8. An apparatus according to claim 1, wherein when it is determined that the current mode is the descending order mode and the write access is an ascending order random access, said access kind discriminating unit switches the mode to the ascending order mode and caches the write data into the buffer section by the ascending order.

9. An apparatus according to claim 1, wherein when it is determined that the current mode is the ascending order mode and the write access is a descending order sequential access, said access kind discriminating unit counts the number of continuous times of the descending order sequential access, and when a count value is less than a specified number of times, the ascending order mode is maintained and the write data is cached into the buffer section by the ascending order, and when the count value reaches the specified number of times, the mode is switched to the descending order mode and the write data is cached into the buffer section by the descending order.

10. An apparatus according to claim 1, wherein when it is determined that the current mode is the descending order mode and the write access is an ascending order sequential access, said access kind discriminating unit counts the number of continuous times of the ascending order sequential access, and when a count value is less than a specified number of times, the descending order mode is maintained and the write data is cached into the buffer section by the descending order, and when the count value reaches the specified number of times, the mode is switched to the ascending order mode and the write data is cached into the buffer section by the ascending order.

11. An apparatus according to claim 1, wherein said buffer construction control unit divides the data buffer area into at least two sections for said random corresponding buffer construction, and in response to the random access from said upper apparatus, when the write data of continuous addresses has already been cached in any one of said divided sections and there is an empty area in continuous areas, said cache control unit caches new write data subsequently to said cached data, and when the write data of the continuous addresses does not exist in any one of said divided sections or, even if such write data exists, there is no empty area in the continuous areas, the apparatus waits for the occurrence of an empty area due to the end of a medium writing of any one of said sections, and said cache control unit caches the new write data into a writing end section.

12. A storing apparatus comprising:

a data buffer area on a memory in which a random corresponding buffer construction which enables a buffer development and a medium writing that are suitable for a random write access has been fixedly set;

a cache control unit for, when an access is received from an upper apparatus caching write data into said data buffer area in said memory, notifying said upper apparatus of a normal end, and thereafter, writing the write data cached in said data buffer area onto a storing medium; and an access kind discriminating unit for setting an ascending order mode for an ascending order access in which a present address is increased from a previous address and setting a descending order mode for a descending order access in which the present address is decreased from the previous address, wherein said cache control unit caches the write data from a head position in a buffer section by the ascending order in said ascending order mode and caches the write data from an end position in the buffer section by the descending order in said descending order mode.

13. A storing apparatus comprising:

a data buffer area on a memory in which a sequential corresponding buffer construction which enables a buffer development and a medium writing that are suitable for a sequential write access has been fixedly set;

a cache control unit for, when an access is received from an upper apparatus, caching write data into said data buffer area in said memory, notifying said upper apparatus of a normal end, and thereafter, writing the write data cached in said data buffer area onto a storing medium; and an access kind discriminating unit for setting an ascending order mode for an ascending order access in which a present address is increased from a previous address and setting a descending order mode for a descending order access in which the present address is decreased from the previous address, wherein said cache control unit caches the write data from a head position in a buffer section by the ascending order in said ascending order mode and caches the write data from an end position in the buffer section by the descending order in said descending order mode.

14. An apparatus according to claim 13, wherein said access kind discriminating unit is constructed in a manner such that p1 the number of continuous times of a descending order sequential access in the state of the ascending order mode is counted, when a count value is less than a specified number of times, the ascending order mode is maintained and the write data is cached into the buffer section by the ascending order, when the count value reaches the specified number of times, the mode is switched to the descending order mode, the write data is cached into the buffer section by the descending order, the number of continuous times of an ascending order sequential access in the state of the descending order mode is counted, when a count value is less than a specified number of times, the descending order mode is maintained and the write data is cached into the buffer section by the descending order, when the count value reaches the specified number of times, the mode is switched to the ascending order mode, and the write data is cached into the buffer section by the ascending order.

15. A storing apparatus comprising:

a cache control unit for, when a write access is received from an upper apparatus, caching write data into a data buffer area in a memory, notifying said upper apparatus of a normal end, and thereafter, writing the write data cached in said data buffer area onto a storing medium;

an access kind discriminating unit for discriminating whether the write access from said upper apparatus is a random access in which write addresses are discontinuous or a sequential access in which the write addresses are continuous; and a buffer construction control unit for setting a random corresponding buffer construction which enables a buffer development and a medium writing that are suitable for said random access or a sequential corresponding buffer construction which enables a buffer development and a medium writing that are suitable for said sequential access, for changing the buffer construction to said sequential corresponding buffer construction when said sequential access is decided in a setting state of said random corresponding buffer construction, and for changing the buffer construction to said random corresponding buffer construction when said random access is decided in a setting state of said sequential corresponding buffer construction;

wherein in the setting state of said sequential corresponding buffer construction, when the number of times of said random access reaches a specified number of times, said buffer construction control unit changes the buffer construction of said data buffer area from said sequential corresponding buffer construction to said random corresponding buffer construction.

16. An apparatus according to claim 15, wherein in the setting state of said random corresponding buffer construction, when the number of writing times by said sequential access reaches a predetermined value, said buffer construction control unit changes the buffer construction of said data buffer area from said random corresponding buffer construction to said sequential corresponding buffer construction.

17. An apparatus according to claim 15, wherein in the setting state of said random corresponding buffer construction, when a write data amount by said sequential access reaches a predetermined capacity, said buffer construction control unit changes the buffer construction of said data buffer area from said random corresponding buffer construction to said sequential corresponding buffer construction.

* * * * *

UNITED STATES PATENT AND TRADEMARK OFFICE
CERTIFICATE OF CORRECTION

PATENT NO. : 6,480,936 B1 Page 1 of 1
DATED : November 12, 2002
INVENTOR(S) : Ban et al.

It is certified that error appears in the above-identified patent and that said Letters Patent is hereby corrected as shown below:

Column 28,
Line 67, delete "p1" and start a new line/paragraph with -- the number... -- therefor.

Signed and Sealed this

Eighth Day of April, 2003

JAMES E. ROGAN
*Director of the United States Patent and Trademark Office*